(12) United States Patent
Gross et al.

(10) Patent No.: US 8,137,493 B2
(45) Date of Patent: Mar. 20, 2012

(54) MULTI-COMPONENT PRODUCT CONTAINER WITH RECLOSABLE TOP

(75) Inventors: Richard A. Gross, Oconomowoc, WI (US); Dieter F. Lay, Oconomowoc, WI (US); Robert W. Fox, Williamsburg, VA (US)

(73) Assignee: Arrow Innovations, LLC, Oconomowoc, WI (US)

( * ) Notice: Subject to any disclaimer, the term of this patent is extended or adjusted under 35 U.S.C. 154(b) by 34 days.

(21) Appl. No.: 12/534,531

(22) Filed: Aug. 3, 2009

(65) Prior Publication Data

US 2009/0314415 A1    Dec. 24, 2009

Related U.S. Application Data

(62) Division of application No. 10/996,012, filed on Nov. 23, 2004, now Pat. No. 7,568,590.

(51) Int. Cl.
*B29C 45/14* (2006.01)
*B29C 57/10* (2006.01)
*B29C 65/16* (2006.01)
*B65B 7/00* (2006.01)

(52) U.S. Cl. ............ 156/69; 156/272.2; 156/273.9; 156/308.4; 264/271.1; 264/273; 264/274; 264/279; 264/478

(58) Field of Classification Search ............ 156/69, 156/272.2, 273.9, 308.4; 264/523, 524, 540, 264/531–534, 271.1, 273, 274, 279, 478
See application file for complete search history.

(56) References Cited

U.S. PATENT DOCUMENTS

| | | | |
|---|---|---|---|
| 3,502,310 A | 3/1970 | Coffman | |
| 3,538,997 A | 11/1970 | Christine | |
| 3,546,746 A | 12/1970 | Johnson | |
| 3,557,265 A | 1/1971 | Chisholm et al. | |
| 3,620,875 A | 11/1971 | Guglielmo, Sr. | |
| 3,620,876 A | 11/1971 | Guglielmo, Sr. | |
| 3,837,517 A | 9/1974 | Held, Jr. | |
| 3,883,034 A * | 5/1975 | Rausing | 220/268 |
| 3,912,154 A | 10/1975 | Godar | |
| 3,947,204 A | 3/1976 | Ayres et al. | |
| 4,201,306 A * | 5/1980 | Dubois et al. | 220/4.05 |
| 4,282,699 A | 8/1981 | Embro, Jr. | |
| 4,447,199 A * | 5/1984 | Reed et al. | 425/182 |
| 4,836,764 A | 6/1989 | Parkinson | |
| 4,871,410 A * | 10/1989 | Bonnebat et al. | 156/244.14 |
| 5,114,507 A | 5/1992 | Piltz et al. | |
| 5,167,781 A | 12/1992 | Kemerer et al. | |
| 5,301,827 A | 4/1994 | Valyi | |
| 5,772,111 A | 6/1998 | Kirsch | |
| 6,220,470 B1 | 4/2001 | McHenry et al. | |
| 6,258,312 B1 | 7/2001 | Heyn | |
| 6,682,686 B1 * | 1/2004 | Iwasaki et al. | 264/328.12 |
| 6,712,232 B2 | 3/2004 | Tanaka et al. | |

* cited by examiner

*Primary Examiner* — Katarzyna Wyrozebski Lee
*Assistant Examiner* — Scott W Dodds
(74) *Attorney, Agent, or Firm* — Boyle Fredrickson, s.c.

(57) ABSTRACT

A container provides sealed storage for contents. The container includes a composite top member formed of a panel and a frame. The panel includes an opening for providing access to the contents of the package. The frame includes a closure member that is molded in an open position, and which can be moved to a closed position for closing the opening in the panel. The container is formed of a container body in the form of a tubular member formed to a desired shape. The container body is closed using the top member that closes a top opening of the container body, and a bottom member that closes a bottom opening of the container body.

7 Claims, 26 Drawing Sheets

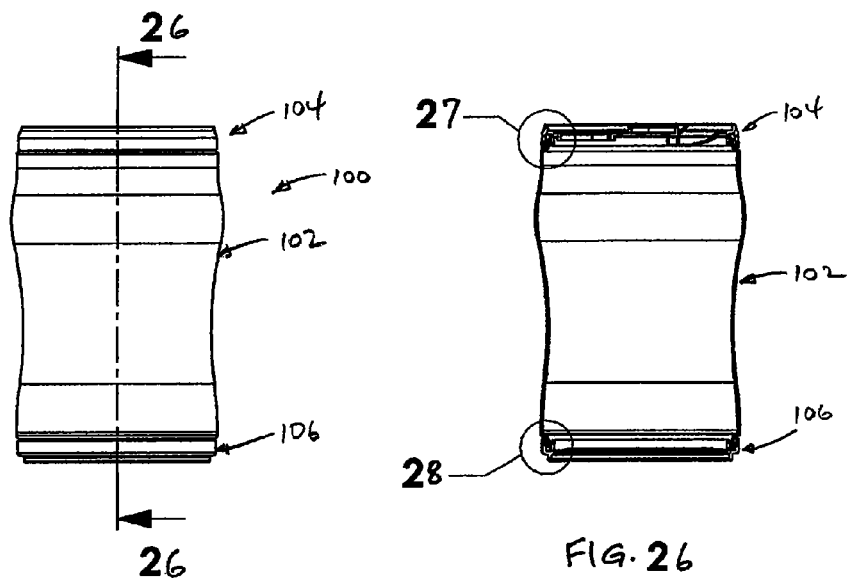
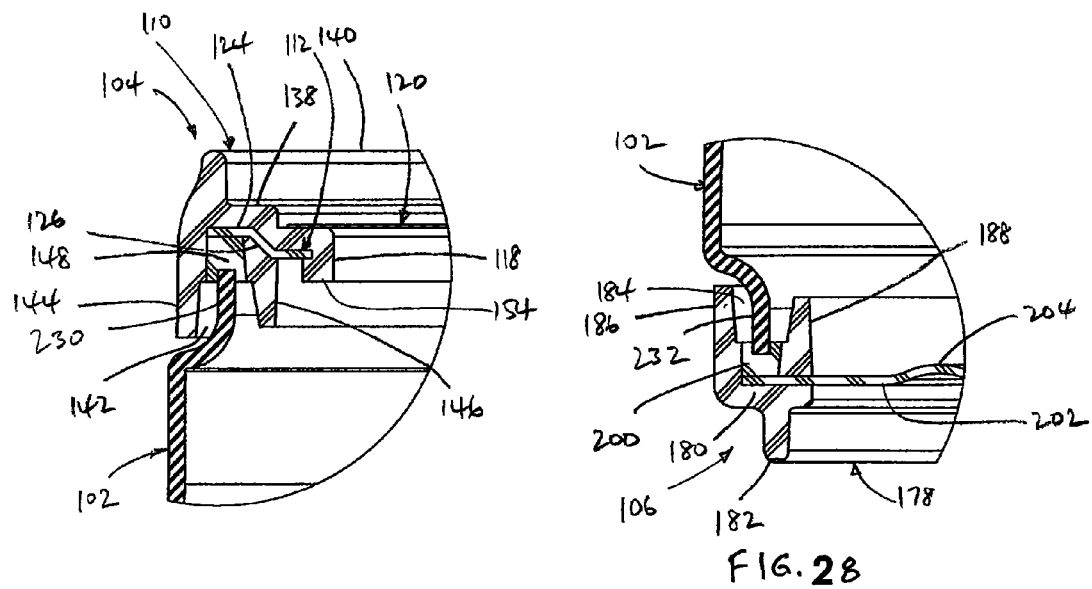

MULTI-COMPONENT PRODUCT CONTAINER WITH RECLOSABLE TOP

CROSS-REFERENCE TO RELATED APPLICATION

This application is a divisional of application Ser. No. 10/996,012 filed Nov. 23, 2004 now U.S. Pat. No. 7,568,590.

BACKGROUND AND SUMMARY OF THE INVENTION

Background of the Invention

The present invention is generally related to providing protection for various products such as foods, drugs, chemicals and other products, including dry, semi-moist and liquid products as well as products which contain particulate of varying sizes and shapes.

The methods used to package and protect foods, drugs and chemicals today include cans, bottles, jars, laminated canisters, and pouches as well as semi-rigid plastic containers. Additionally, most food, beverage and pharmaceutical products require more product protection that can be achieved by a single polymeric material. It is known that different combinations of materials can be used together to achieve desired protection in the areas of gas, moisture, chemical and thermal resistance properties, as well as physical properties that cannot be achieved economically by other means. In some instances, the desired properties can be achieved by a physical blend of various materials, such as Dupont Sclair™ films which are an alloy or blend of nylon and polyethylene used in the packaging of fluid milk and other food products. Recently, inorganic nano sized particles have been found to make significant improvements in the gas barrier properties of most polymers in which they are dispensed (see, e.g., JP 89308879.9). By themselves, these alloys have been useful in providing some additional shelf life for refrigerated products or for products that are fairly tolerant of oxygen.

In some instances, nano particles have been used in conjunction with oxygen scavengers to improve the gas barrier of the carrier polymer and provide a source of moisture for an anti-oxidant of the oxygen scavenger that make up the alloy (see, e.g., JP 63281964). These blends, which contain both an oxygen scavenger and inorganic platelets to create a tortuous path, are an improvement but do not, by themselves, provide the cost nor esthetics and continuing protection required for extended shelf life or shelf image of most oxygen intolerant, shelf stable foods and other products.

For critical packaging requirements of this type, the solution had been to package products in metal cans or glass jars. This solution endured until the development of semi-rigid, multi-layer, high-barrier plastics, which were commercialized in the mid 1980's in packaging for such products as puddings, fruit compotes and single serve entrees. Previously, multi-layer, adhesive laminated, high-barrier thermoformed sheet technology had been used for small containers to package jams and jellies for single-serve, ready to use packs. These packs were produced based upon aqueous coating technology utilizing Poly-Vinylidene Chloride (PVDC). The PVDC coating, while very effective in a flat film form, is not capable of being stretched more that 10% without breaking apart. This prevents aqueous PVDC coatings from being used for larger sized or deeper packages. To overcome extensibility problems, further development resulted in an extrudable version and a method of combining it in a laminar method through a process known as coextrusion, as disclosed in U.S. Pat. No. 3,557,265.

Coextrusion was used in the creation of packages for both high and low acid foods, with the first publicized application of "plastic cans" being thermally processed (retorted) in the mid-1970's. "Plastic cans" are prevalent today, and are typically produced using a process known as solid-phase pressure-forming and, more recently, using multi-layered injection blow molding and/or extrusion blow molding processes. This process was developed in the early 1970's in an effort to create sales opportunities for a newly commercialized plastic polymer known as polypropylene. Johnson U.S. Pat. No. 3,546,746 teaches that plastic articles can be thermoformed not only from flat sheets but also from pre-cut shapes called billets or blanks. U.S. Pat. No. 3,502,310 to Coffman demonstrates an improved process involving heating the billets continuously and forming several articles simultaneously.

The primary advantage of forming articles and specifically containers from pre-formed plastic billets did not become obvious until the mid 1980's when multi-layered plastic sheeting began to be used for the packaging and preserving of processed shelf stable foods. Plastic barrier containers have now become common and the primary methods of producing containers for shelf-stable applications are described below.

In a representative process, adhesively laminated or coextruded sheet is web or sheet fed through a radiant or contact heating oven and then thermoformed into its final shape by means of vacuum and/or pressure, with an additional assist from a movable plug to help distribute material for deep or tall containers, where required. Containers are then trimmed out of the web or sheet by trim tooling, which can either be a trim in place style which removes the part from the web as part of the forming process, or an off-line style in which parts can be trimmed out of the web or sheet in a secondary trimming process. Web scrap generated in this process typically exceeds 40% of the total web used in the process, and is not uncommon to see scrap losses of 50% on round container shapes. This high percentage of scrap increases the cost of the finished parts, since not all of the scrap can be recovered. In addition, the recoverable portion of the scrap is valued only at the cost of the lowest priced material in the web, since the only real value of such material is as a structural component. The benefit of the more expensive barrier materials is lost when the web skeleton is ground up to make regrind.

To maintain the barrier characteristics of the original individual layers or phases of the laminated sheet, each individual material must maintain its individual integrity. Grinding the web skeleton into regrind destroys the integrity of the individual layers. The resulting blended materials, when extruded into a sheet, have none of the gas barrier characteristics of the original multilayered sheet and in fact will have lost some of the physical properties of the initial structural material used in the original sheet manufacture. Additionally, some of the components in the original multilayered sheet are typically approved for indirect food contact only in high temperature food processing conditions. Because these materials are no longer sandwiched into the center portion of the sheet, it becomes necessary to place a separate food contact layer between the regrind component and the food product to insure that the materials, which are only acceptable for indirect food contact, are kept in that position.

In addition, if the initial multilayered sheet was clear, the use of regrind will diminish the clarity in direct proportion to the amount of regrind being used in the sheet. For containers which contain both polypropylene and EVOH (EVOH@1.5% or more), it has been commercially demonstrated that structures which incorporate web scrap of 15% or more are noticeably cloudy and at levels of 20% become unacceptable for most applications. The web skeleton that is not recovered and reused back into the manufacture of sheet is then sold off as waste, with a salvage value less than half that of the reused regrind, further increasing the cost of the original parts produced from the web.

Reduced scrap thermoforming has been developed to a commercial state in the U.S. by two patented methods, the first being a scrapless forming process as shown in U.S. Pat. No. 3,947,204, and the second being a billet forming process as shown in U.S. Pat. Nos. 3,502,310; 3,546,746; and 3,538,997. Both methods incorporate process benefits described by Briston, et al., in PLASTICS IN CONTACT WITH FOODS, 466 pages, received in the PTO scientific library Dec. 31, 1974, as well as the process improvements for transporting the billets identified in Frados et al., PLASTICS ENGINEERING HANDBOOK, ISBN 0-442-22469-9, Library of Congress Catalog Card Number 75-26508 pages 315 & 316, describing the Hoffco/Beloit Forming System. The original forming processes also benefited from the teachings of U.S. Pat. No. 3,538,997, which discloses the individual transportation of the billets through the oven and into the forming station wherein the carrier becomes a central part of the forming tool. Once formed, the carrier tray transports the finished parts to the removal station and begins the cycle again. This process is adapted in Parkinson U.S. Pat. No. 4,836,764.

Plastic containers used in the packaging of shelf stable foods required not only adequate barrier to prevent the oxidation of the products contained within the package, but also had to prevent the gain or loss of moisture as well. As discussed, it is possible to design a multilayered package with the required barrier properties. However, the closures for these types of packages require a different approach or method so as to allow easy access to the product. Initially, metallic foils laminated and/or extrusion coated with polymeric thermal sealing compounds were developed to provide controllable seal strengths for ease of opening. In order to utilize these flexible-sealing membranes, a sealing surface or flange had to be designed into the package. These sealing surfaces typically were flat, although some exceptions were found to be workable such as that created by Embro and disclosed in U.S. Pat. No. 4,282,699.

Metal can ends have also been used to seal these newer plastic containers with some success. However the can ends require that the plastic container have a flange, which is approximately 0.021" thick. However, the starting thickness of the sheet is typically greater that 0.080" and can be as thick as 0.115". The required thickness of the plastic container flanges thus necessitates that the sheet be significantly reduced in thickness in order to meet the specifications of the metal end. Reducing the sheet thickness to this degree typically creates interlayer adhesion and other problems. Interlayer adhesion of the compression molded double seamable flange can cause operational problems if the problems are not caught before they appear on the production floor. Additionally, the cut edge exposes the hydroscopic barrier materials to a high level of moisture pickup, thereby diminishing its barrier properties.

It is an object of the present invention to provide a product package that overcomes the above-noted problems with prior art packages. It is a further object of the invention to provide a multi-component product package that can be formed in various shapes and sizes, and is not limited to use of round mating surfaces as in the prior art. Another object of the invention is to provide a product package providing a seal of high integrity between the body and the end members of the package. A still further object of the invention is to provide a product package that can be efficiently manufactured with minimal waste using a container body closed by a pair of end members. Another object of the invention is to provide a product package that has the same relative or improved amount of product protection as prior art packages, while consuming much less energy in the comparative total life cycle. A still further object of the invention is to provide a product package in which the container body can be contoured according to manufacturer or user requirements. Yet another object of the invention is to provide a product package having a reclosable opening to provide access to the contents of the package, and which provides convenience in opening, dispensing and re-closing the package. A further object of the invention is to provide a product package that is capable of efficient and rapid mass production, to provide a lower cost package than is currently available for barrier property containers. A still further object of the invention is to provide a product package that is relatively inexpensive to manufacture, yet which provides improved barrier characteristics and flexibility in package design over prior art packages.

SUMMARY OF THE INVENTION

In accordance with the present invention, a product package or storage container includes a container body having an interior and including an upper edge defining an upper opening and a lower edge defining a lower opening. The storage container further includes a top member bonded to the upper edge to enclose the upper opening, and a bottom member bonded to the lower edge to enclose the lower opening. The top member includes a top member opening to provide access to the interior of the container body. The top member includes a panel, and the top member opening is in the form of an opening in the panel. The top member further includes a frame adapted for use in securing the top member to the upper edge defined by the container body, and the frame includes a peripheral outer area. The opening in the panel member is located inwardly of the peripheral outer area of the frame. In a preferred embodiment, the top member and the bottom member each include a fusion member for use in bonding the top member and the bottom member to the upper edge and the lower edge, respectively, of the container body. Each fusion member is contained within a channel defined by one of the top and bottom members. The channel defined by the top member is configured to receive the upper edge of the container body, and the channel defined by the bottom member is configured to receive the lower edge of the container body. Each fusion member is formed of a material that is responsive to externally applied energy, such as radio frequency (RF) energy or an electromagnetic field. Exposure of the fusion member to the externally applied energy, such as RF energy or an electromagnetic field, results in non-contact application of the fusion member to such energy that heats the material of the fusion member to cause the fusion member to bond with the edge of the container body. Each fusion member is preferably injection molded into a peripheral edge portion, such as a channel portion, of each end member. The fusion member may be injection molded into the channel portion of the end member simultaneously with insert molding the panel into the peripheral edge portion of the end member.

The container body is preferably in the form of a tubular member formed of deformable material. The tubular member may be configured to define a contoured wall that is shaped in a forming operation carried out prior to bonding the top member and the bottom member to the container body. The forming operation includes sealing the top and bottom openings of the tubular member, placing the tubular member in a pliable state, and subjecting the interior of the tubular member to internal pressure that applies an outward force to the wall or by creating a vacuum between the exterior wall of the tube and the surface of the mold, or a combination of both forces acting upon the interior and exterior surfaces of the pliable tube walls. The tubular member is contained within a mold having contoured surfaces that contact the pliable wall of the tubular member as the wall is moved outwardly, to form the contoured wall when the interior of the tubular member is subjected to internal pressure. The acts of sealing the top and bottom openings of the tubular member are carried out by engaging top and bottom seal members with the top and bottom edges of the container body, respectively, and the act of subjecting the interior of the tubular member to internal pressure may be carried out by applying a pressurized gas to the interior of the tubular member through one of the top and bottom seal members.

This aspect of the invention also contemplates a method of making a container, substantially in accordance with the foregoing summary.

In accordance with another aspect of the invention, a storage container includes a container body having one or more sides, an upper edge defining an upper opening, and a bottom; in combination with a top member secured to the upper edge and configured to enclose the upper opening. The top member includes an interior panel having a panel opening, and a removable seal member that encloses the panel opening. The top member further includes a movable closure member that is interconnected with the top member so as to provide movement of the closure member between an open position for exposing the panel opening when the removable seal member is removed, and a closed position in which the movable closure member overlies and closes the panel opening. The top member includes a frame to which the interior panel is bonded, and the frame includes means for bonding the frame to the upper edge of the container body. The means for bonding the frame to the upper edge of the container body is preferably in the form of a fusion ring, as described previously. In a preferred form, the interior panel defines a peripheral edge area, and the interior panel is insert molded during formation of the frame. The frame is configured to surround the peripheral edge area of the interior panel.

The movable closure member is formed along with the frame, and is preferably interconnected with a platform area of the frame that overlies the panel opening. In the open position, the movable closure member overlies an area of the interior panel adjacent the panel opening. Release means, in the form of a release agent, is interposed between the interior panel and the movable closure member for preventing the movable closure member from adhering to the interior panel during formation of the movable closure member. The movable closure member may include a tab member adapted for manual engagement by a user to facilitate movement of the movable closure member between the open and closed positions. The interior panel includes a recess, and the tab member at least partially overlies the recess to enable manual engagement of the tab member from within the recess.

The movable closure member is interconnected with the top member via a hinge connection that provides pivoting movement of the movable closure member between the open and closed positions. The hinge connection is in the form of a hinge area of material located between the movable closure member and the panel opening that is formed along with the frame and the movable closure member. The platform area of the frame is formed to define a lip area that surrounds the panel opening, and the hinge area of material is located between the lip area and the closure member. In one form, the hinge area of material is at least in part defined by an underlying protrusion defined by the interior panel during formation of the platform area and the movable closure member.

This aspect of the invention further contemplates a top member for use in closing an upper opening defined by a container and a method for manufacturing a reclosable top for a container, substantially in accordance with the foregoing summary.

While the aspects of the present invention may be employed separately to provide a container or package that has improved characteristics or features compared to the prior art, it is contemplated that the various aspects of the invention are particularly advantageous in combination to deliver significant advantages and benefits both to the manufacturer and to the consumer, in an efficient and cost effective manner.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 25 is an elevation view of the assembled container as in FIG. 1, showing the container top member secured to the top of the container body and the bottom member secured to the bottom of the container body;

FIG. 26 is a cross sectional view along line 26-26 of FIG. 25;

FIG. 27 is an enlarged segmented view within circle 27 of FIG. 26;

FIG. 28 is an enlarged segmented view within circle 28 of FIG. 26;

FIG. 50 is a section view taken along line 50-50 of FIG. 49.

DETAILED DESCRIPTION OF THE INVENTION

Figure 1:
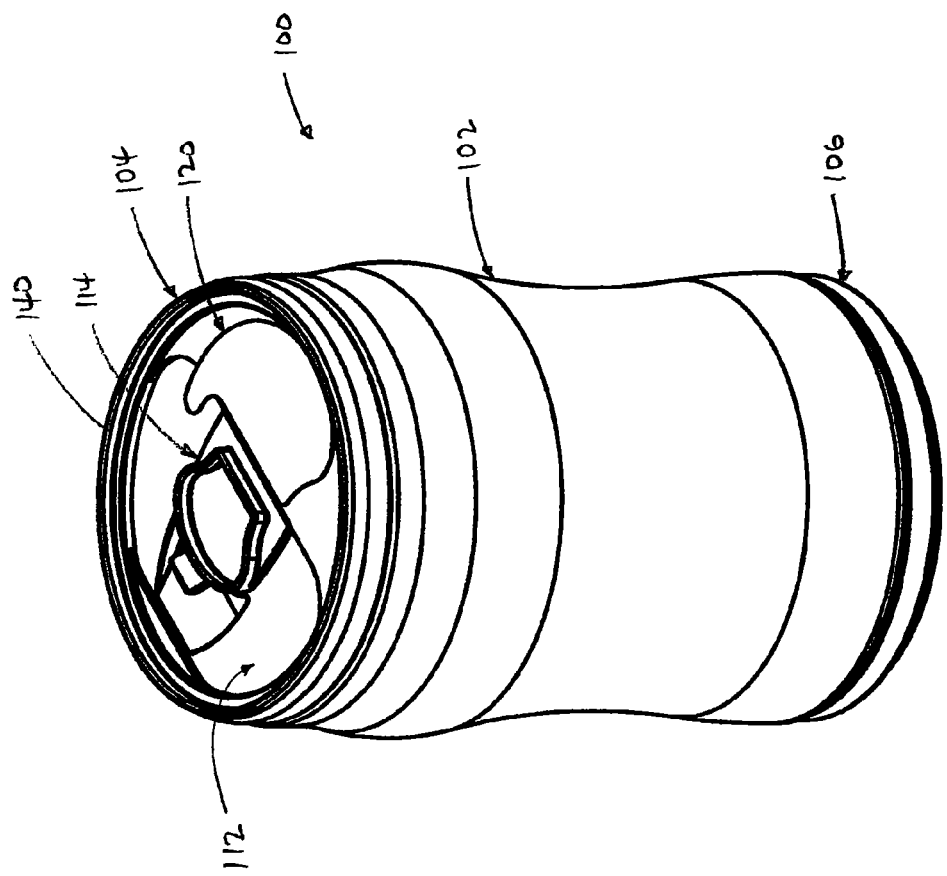
FIG. 1 is an isometric view of a container incorporating the various aspects of the present invention.
Figure 2:
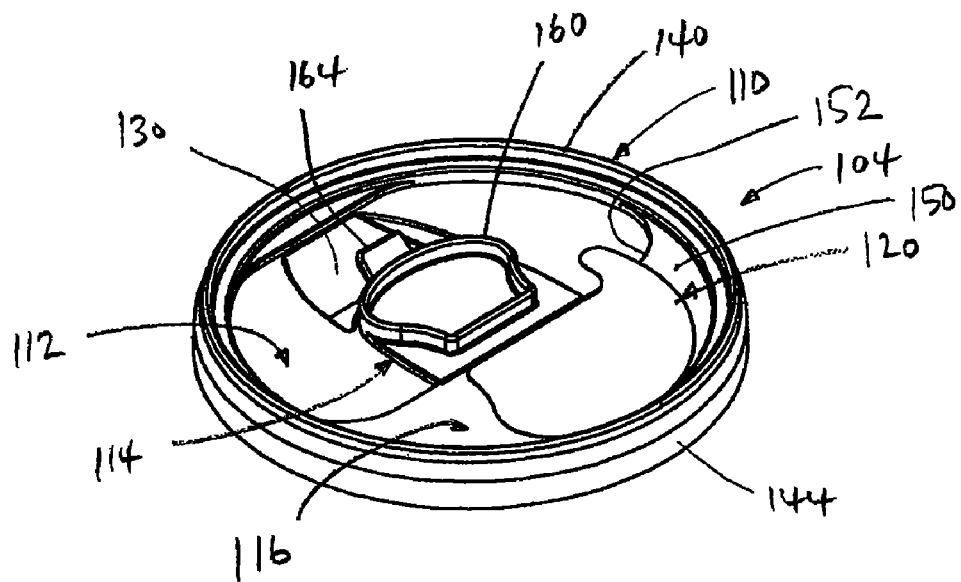
FIG. 2 is an isometric topside view of a lid or top member for the container of FIG. 1, showing the top member as molded and showing a seal membrane in place over an opening that provides access to the interior of the container, and further showing the movable closure member in the open position.

The following is a detailed description of the preferred embodiment of the invention. It is important to note that the invention is not limited to the shapes, sizes and proportions shown in the figures and discussed in the following description. Even though the embodiments shown and discussed are in the form of round or cylindrical packages and package components, it is anticipated that other shapes such as square, rectangular, oval, triangular, and polygonal, etc. could be used. Likewise, it is anticipated that other features of the design, such as the lid opening and mating closure, could also have a multitude of shapes, sizes and proportions. The preformed containers shown are not restrictive to the specific embodiment with which they are associated in the figures.

This invention seeks to replace the more energy and/or material intensive packages with packages which provide the same relative amount of product protection while consuming much less energy in their comparative total life cycle. Additionally, the package seeks to provide improvements or benefits not possible with current forms of packaging. These improvements relate both to the manufacturing processes as well as more use-oriented benefits. While it may be possible to obtain packages which contain one or more of these improvements or benefits, our system is the first to offer all of these benefits to the manufacturer and/or consumer at one time, in a cost effective manner.

To be considered as possible replacements for traditional metal, double seamed ends, it is necessary for plastic closures to provide the same product protection, food process compatibility and ease of container access offered by traditional closures. Today, using the molding technologies disclosed herein, it is possible to produce all-plastic closures that meet the minimum criteria established by the traditional closures.

The features of a container lid or bottom cap that includes a frame made from a thermoplastic polymeric material, a pre-formed, pre-treated, and pre-die-cut, multi-layered, semi-rigid, high-barrier plastic panel and a fusion ring made from an electromagnetic, radio frequency, or ultrasonic polymeric, fusible material suitable for bi-injection molding, and the process for the manufacture of the container lid and bottom cap, are disclosed in copending patent application serial number PCT/US03/25713 filed Aug. 18, 2003 and entitled MULTI-COMPONENT PACKAGING SYSTEMS FOR SHELF STABLE FOODS AND BEVERAGES, the disclosure of which is hereby incorporated by reference.

The capability to mold multiple materials (in addition to insert molding and in-mold heat-sealing) allows for plastic ends to be developed which can be designed to provide adequate keeping properties in terms of gas and moisture barriers. Additionally, the ends can be designed to thermally weld to the contacted surfaces of the container by the use of ultrasonic, electromagnetic or RF heating of the fusion bonding system. Heating of the bonding system by either of these means will raise the temperature of the fusion bonding material and the materials it contacts to their fusion temperature. Once this temperature is achieved, the similar materials contained in both the container and the closure exchange molecules at the interface of these adjacent articles to be joined and a thermal/fusion weld is made. The preferred process of induction is not new but previously had required the insertion of electro-magnetically and/or RF excitable or conductive materials such as wire, metal foil or a metal-powder filled gasket or liquid adhesive between the parts to be welded (U.S. Pat. Nos. 5,114,507; 6,258,312; 3,620,875; 3,620,876; 4,201,306, all hereby incorporated by reference).

The electromagnetic and/or conductive materials, or RF responsive materials, that may used in our fusion ring may include powders of stainless steel, tin oxide, iron, carbon black, carbonaceous or other materials. The preferred material will include iron powder similar to those described in expired U.S. Pat. Nos. 3,620,876 and 3,620,875 except that any and all materials will be required to be acceptable for direct food contact by the U.S. Food and Drug Administration when the fusion ring is to be used in a package containing human or non-human food. The preferred materials that meet these criteria include both a sponge iron powder (FG 100) as manufactured by the Hoeganaes Company, Inc of Ramsey, N.J. or a carbonyl iron powder (Ferronyl) as produced by ISP Technologies Inc. of Freehold, N.J. or other similar food grade iron powders.

Containers may be made of polymeric materials typically used for packaging and include materials such as polyethylene, polystyrene, polypropylene, polyester, polycarbonate, acrylonitrile-butydene-styrene, acrylic-terpolymers, nylon or polyvinyl-chloride as well as other materials used in the manufacture of packages.

Referring to FIG. 1, a container 100 in accordance with the present invention generally includes a container body 102 that defines an interior and open top and bottom ends, in combination with a lid or top member 104 secured to the upper end of container body 102, and a bottom cap or member 106 secured to the lower end of container body 102. Container 100 is adapted to contain solid or liquid products in any flowable form, such as foods, drugs, chemicals and other products, including dry, semi-moist and liquid products.

Figure 3:
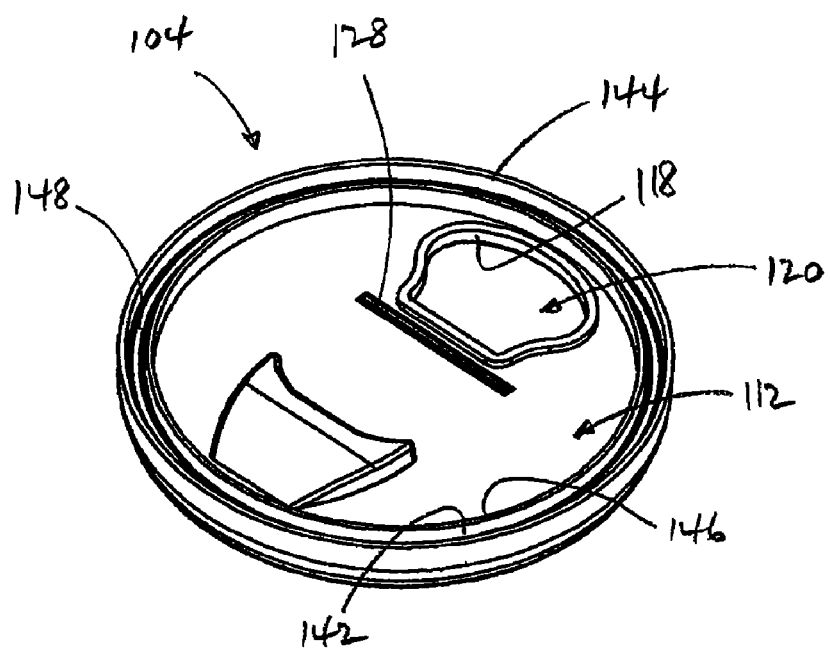
FIG. 3 is an isometric underside view of the container top member of FIG. 2.
Figure 4:
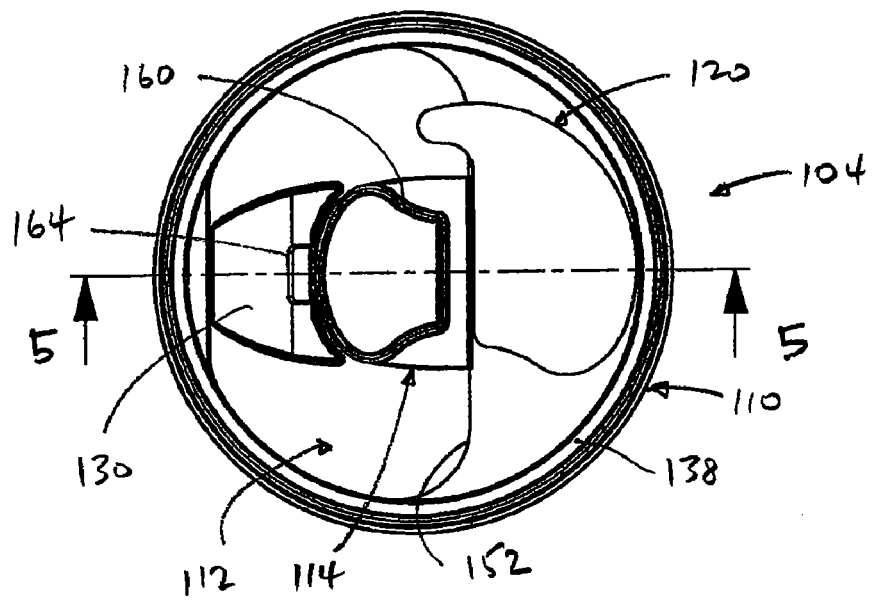
FIG. 4 is a top plan view of the container top member of FIG. 2.
Figure 6:
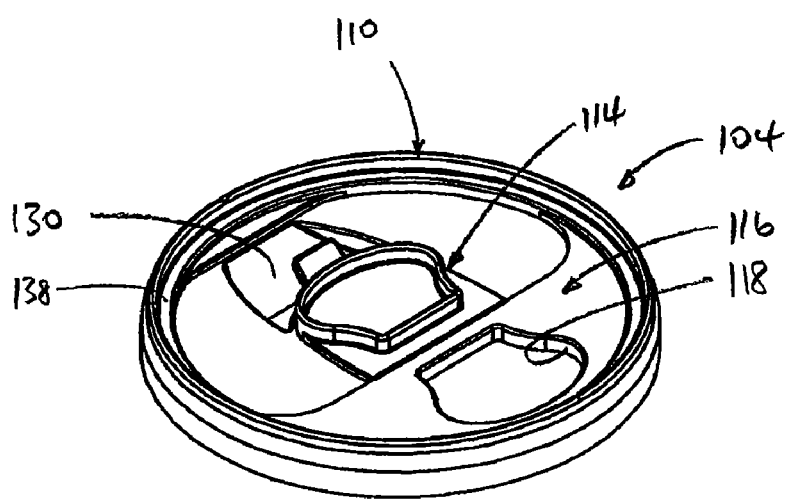
FIG. 6 is an isometric topside view of the container top member of FIG. 2, showing the seal membrane removed and further showing the movable closure member in the open position in which the opening in the top member is exposed to provide access to the interior of the container.
Figure 5:
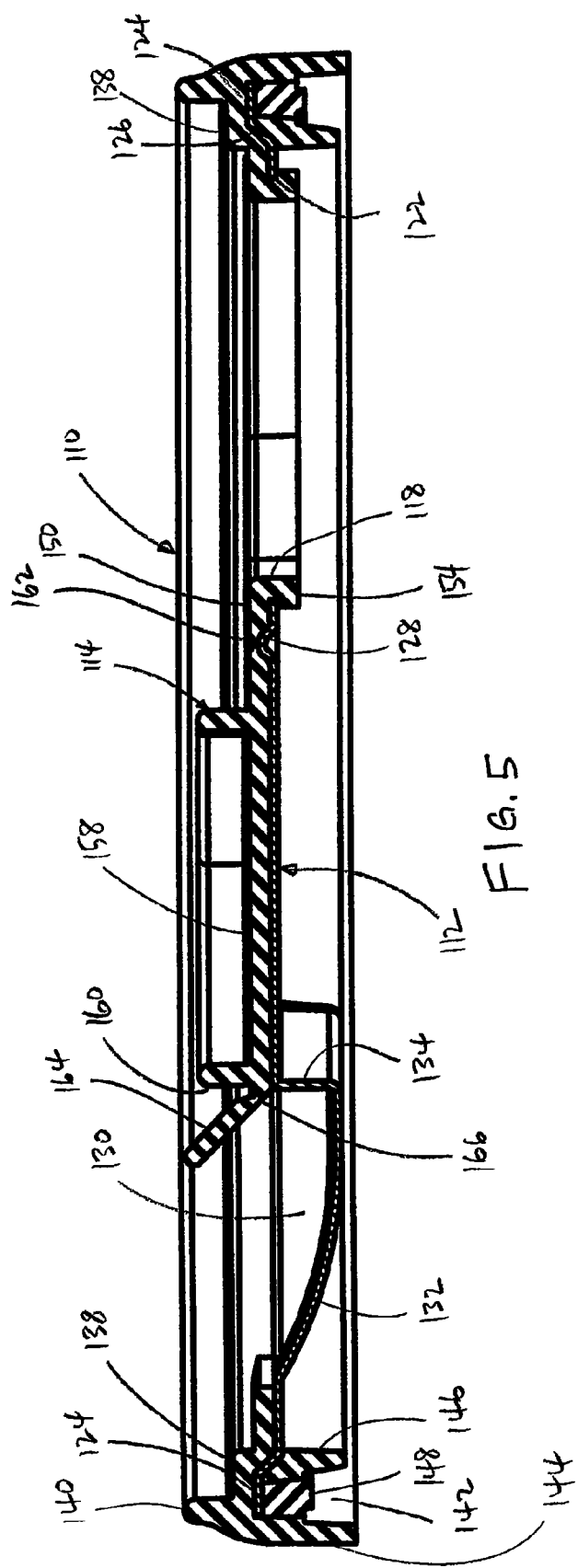
FIG. 5 is a cross sectional view along line 5-5 of FIG. 4.

Referring to FIGS. 2-9, top member 104 includes a frame 110, an interior panel 112, and a closure member 114. Frame 110 defines an outer periphery that surrounds an outer edge defined by panel 112. Frame 110 further includes a platform 116 that overlies a portion of panel 112 and is located inwardly of the outer periphery defined by frame 110. Platform 116 includes an opening 118 (FIG. 3). Top member 104 further includes a removable seal member 120 that is secured to platform 116 over opening 118. Seal member 120 is configured to be secured to the upper surface of platform 116 outwardly of opening 118, to provide an air-tight seal of opening 118.

Panel 112 of top member 104 is formed of a suitable pre-treated, multi-layered, semi-flexible, high-barrier thermoplastic material, as is known in the art. Panel 112 is selected to have the desired gas, moisture barrier and physical properties required by the product or commercial sterilization process of container 100. Panel 112 may be formed by die cutting from a sheet in a shape to match the shape of frame 110, and is formed to include a panel opening 122 defined by a peripheral edge. Panel 112 is further formed to define an outer raised flange 124, and an angled ring section 126 located inwardly of outer flange 124. Panel 112 further includes a generally linear transverse protrusion 128 located adjacent platform opening 118. Platform 112 further includes a recess 130 defined by a sloped bottom wall 132 and an end wall 134. Recess 130 is located on panel 112 so as to be opposite platform opening 118 relative to protrusion 128.

Frame 110 of top member 104 includes a shoulder 138 that overlies flange 124 of panel 112. A peripheral outer rim 140 extends upwardly from shoulder 138. Below shoulder 138, frame 110 defines a channel 142 formed by an outer leg 144 and an inner leg 146. A fusion member, in the form of a fusion ring 148, is located within channel 142. Fusion ring 148 is configured so as to be located within the upper extent of channel 142 between outer leg 144 and inner leg 146. Fusion ring 148 defines an upper surface that underlies panel flange 124 and is formed so as to have a similar outside diameter as the outside diameter of panel 112. The properties and function of fusion ring 148 are set forth in the above-referenced copending application serial number PCT/US03/25713.

Platform 116 and closure member 114 are formed integrally with frame 110. Platform 116 generally defines an upper wall 150 that overlies the upper surface of a portion of panel 112 about panel opening 122. Platform 116 defines an inner edge 152. Platform 116 occupies the area between inner edge 152 and shoulder 138, so as to overlie the portion of panel 112 in which panel opening 122 is formed. Platform 116 further includes a depending peripheral lip 154 that surrounds and encapsulates the edge of panel 112 that defines panel opening 122, and the inner edge of platform lip 154 defines platform opening 118. Platform lip 154 is configured so as to surround the area of panel 112 adjacent panel opening 122, with a portion of lip 154 being located below panel 112 and a portion of lip 154 being located inwardly of the edge of panel 112 defining panel opening 122. In the event panel 112 includes an EVOH layer, lip 154 prevents the EVOH layer from being exposed to high temperature products, which is restricted under current FDA regulations.

Closure member 114 of top member 104 is formed in an open position, as shown in FIGS. 1-6. Closure member 114 includes a generally planar closure wall 158, in combination with a peripheral closure rim 160 having a shape that matches that of platform opening 118. Closure wall 158 is joined to platform upper wall 150 via a hinge section 162 that overlies panel protrusion 128. Hinge section 162 provides movement of closure member 114 between an open position and a closed position, in a manner to be explained. In addition, closure member 114 includes a tab 164 that is located over panel recess 130 when closure member 114 is in the open position. A flexible hinge 166 is interposed between tab 164 and closure wall 158 of closure member 114.

Figure 10:
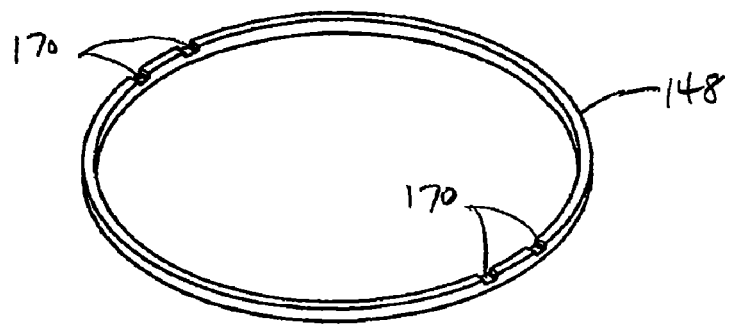
FIG. 10 is an isometric view of a fusion ring incorporated in the container top member of FIG. 2 and/or the bottom member of FIG. 13 for use in bonding the top member to the upper edge of a container body or for use in bonding the bottom member to the bottom edge of a container body.
Figure 12:
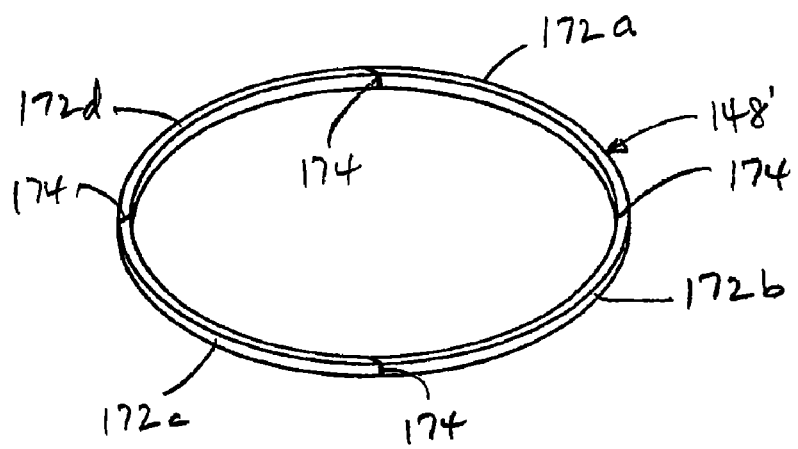
FIG. 12 is an isometric view of another embodiment of a fusion ring adapted to be incorporated in the container top member of FIG. 2 and/or bottom member of FIG. 13.

FIG. 10 illustrates fusion ring 148. In the illustrated embodiment, fusion ring 148 is circular in shape. It is understood, however, that fusion ring 148 may have any other desired shape according to the configuration of the container into which fusion ring 148 is incorporated. Fusion ring 148 includes opposed pairs of passages 170, in the form of depressions or recesses that extend below the upper edge of fusion ring 148 and throughout the width of fusion ring 148. FIG. 12 illustrates an alternative fusion ring 148' formed of separate ring sections 172a, 172b, 172c and 172d, which are separated by spaces or gaps 174 to provide passages between the inner and outer surfaces of fusion ring 148'.

Figure 11:
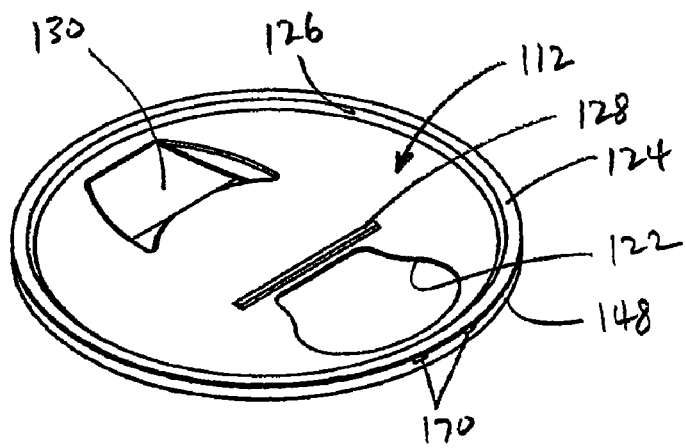
FIG. 11 is an isometric view of the fusion ring of FIG. 10 in combination with a plastic panel incorporated in the top member, showing the fusion ring and the panel prior to the molding of the frame of the top member.

FIG. 11 shows panel 112 and fusion ring 148 prior to molding of panel 112 and fusion ring 148 into top member 104. Flange 124 of panel 112 is positioned so as to rest on the upper surface of fusion ring 148. Passages 170 communicate between the inner and outer surfaces of fusion ring 148, and panel flange 124 overlies passages 170.

Representatively, the process for the manufacture of top member 104 is as follows. A first mold section and a second mold section are configured to form a cavity for molding of fusion ring 148. After fusion ring 148 is formed, the second mold section is removed and panel 112 is placed onto fusion ring 148, as shown in FIG. 11, such that flange 124 of panel 112 contacts and rests on the upper surface of fusion ring 148. A third mold section is then positioned over the first mold section, so as to enclose fusion ring 148 and panel 112. The first and third mold sections have cavities that correspond in shape to frame 110 including platform 116 and closure member 114. Thermoplastic polymeric material in a flowable state is then injected into the mold cavities so as to form the various contours, features and surfaces of frame 110, platform 116 and closure member 114 as shown and described. Passages 170 in fusion ring 148 enable the thermoplastic material to flow through fusion ring 148, to form the areas of frame 110 that underlie panel 112. In the event fusion ring 148' is used, the spaces or gaps 174 between the section 172a-172d allow material to form the areas of frame 110 that underlie panel 112. Top member 104 is then removed or ejected from the mold sections in any satisfactory manner. Seal member 120 may be applied to platform 116 to enclose platform opening 118 either before or after top member 104 is released or ejected from the mold.

Figure 7:
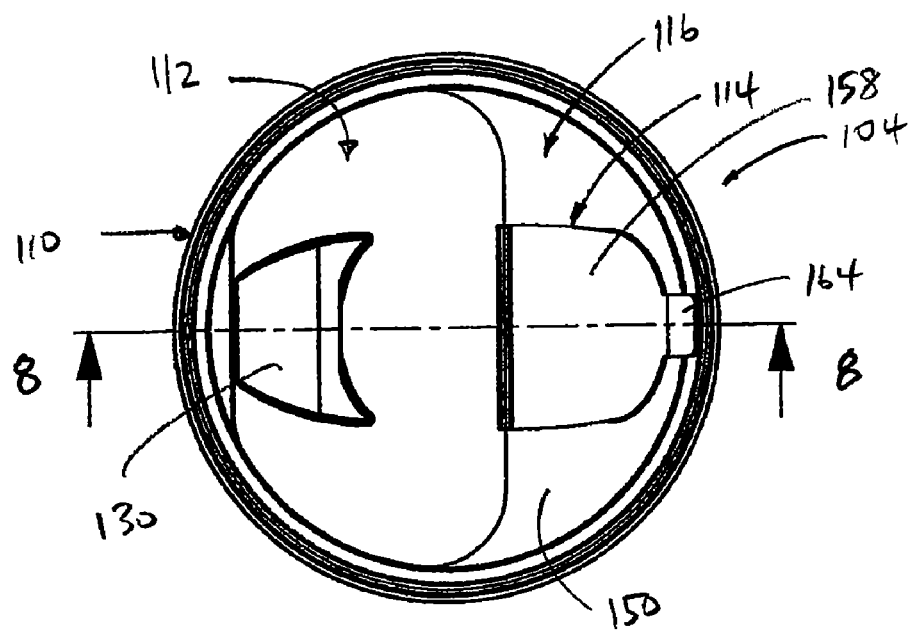
FIG. 7 is a top plan view of the container top member of FIG. 2, showing the movable closure member in the closed position in which the opening in the top member is closed to prevent access to the interior of the container.
Figure 9:
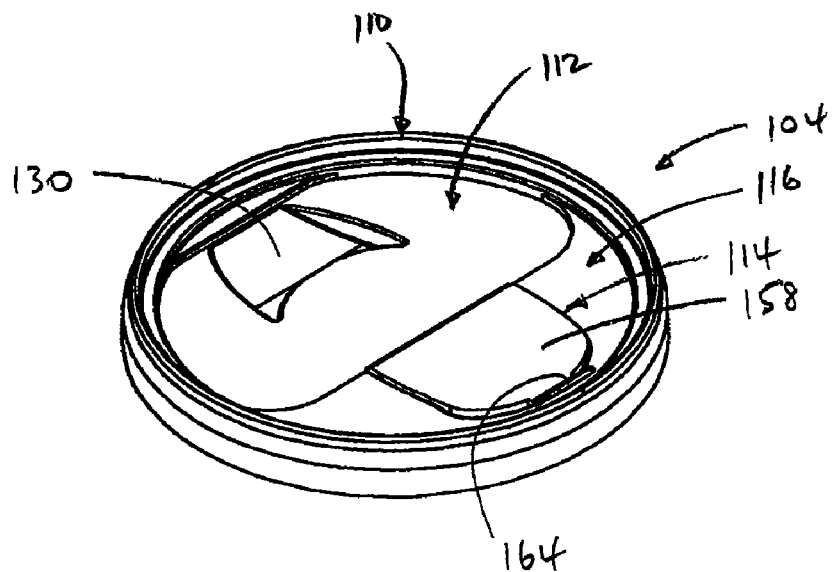
FIG. 9 is an isometric topside view of the container top member of FIG. 2, showing the movable closure member in the closed position in which the opening in the top member is closed to prevent access to the interior of the container.
Figure 8:
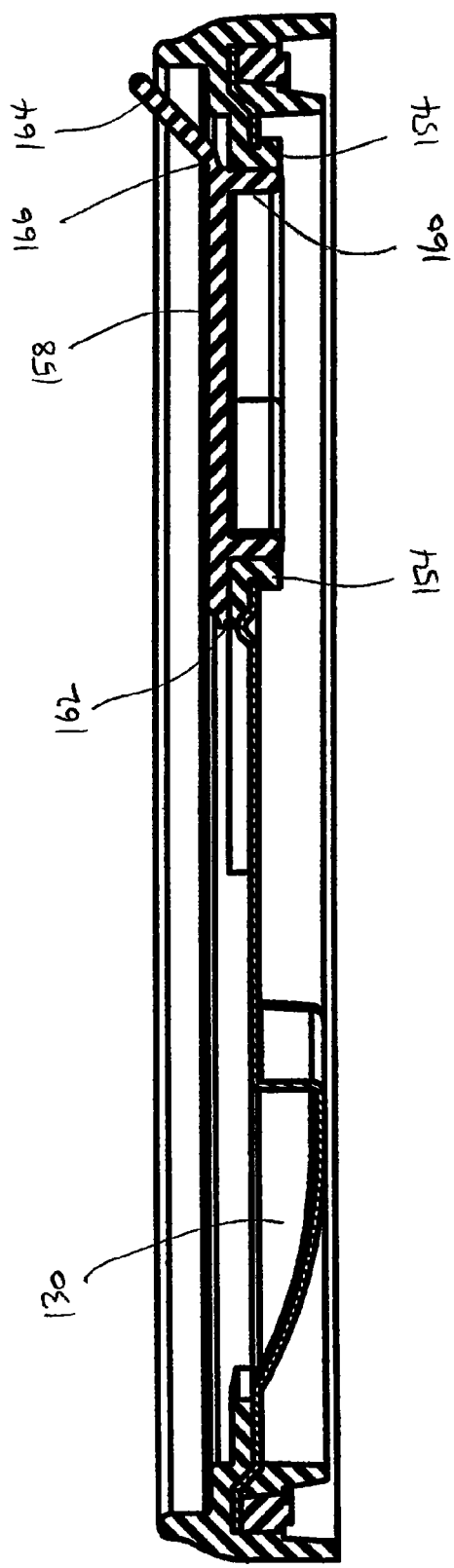
FIG. 8 is a cross sectional view along line 8-8 of FIG. 7.

When seal member 120 is removed, so as to expose platform opening 118, closure member 114 may be employed to selectively close platform opening 118. FIGS. 7-9 show the closed position of closure member 114, in which closure member 114 closes platform opening 118. To move closure member 114 from the open position to the closed position, the user grasps tab 164 of closure member 114 and applies an upward force to closure member 114. Recess 130 in panel 112 facilitates such manual engagement of tab 164 by the user. Application of the upward force to closure member 114 functions to pivot closure member 114 about hinge section 162. The user continues such pivoting movement of closure member 114 away from the open position, so that closure member rim 160 is moved toward platform opening 118 by application of a downward force to closure member 114. The user continues such pivoting movement of closure member 114 until closure member rim 160 is engaged within platform opening 118. Tab 164 pivots about hinge 166, so as to allow tab 164 to extend upwardly when closure member 114 is in the closed position. In this manner, tab 164 can be subsequently used to facilitate movement of closure member 114 from the closed position back toward the open position, when it is once again desired to expose platform opening 118. It is also contemplated that tab 164 may be formed without hinge 166, so that the angular position of tab 164 on closure member 114 remains fixed. In this embodiment, rim 140 of top member 104 is preferably provided with a recess or gap within which tab 164 is received when closure member 104 is pivoted to the open position.

During manufacture, a release agent is coated or printed onto the upper surface of panel 112 that underlies closure member 114. In this manner, when closure member 114 is made by injecting the flowable thermoplastic material onto and about panel 112, the material that forms closure member 114 does not adhere to or otherwise bond with the underlying material of panel 112, to enable closure member 114 to easily be moved from its open position toward its closed position.

Figure 13:
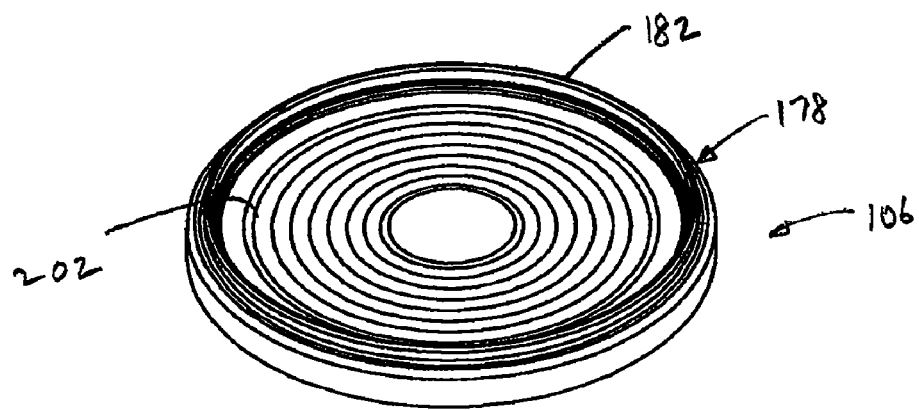
FIG. 13 is an isometric topside view of a bottom member for use in forming the container of FIG. 1.
Figure 15:
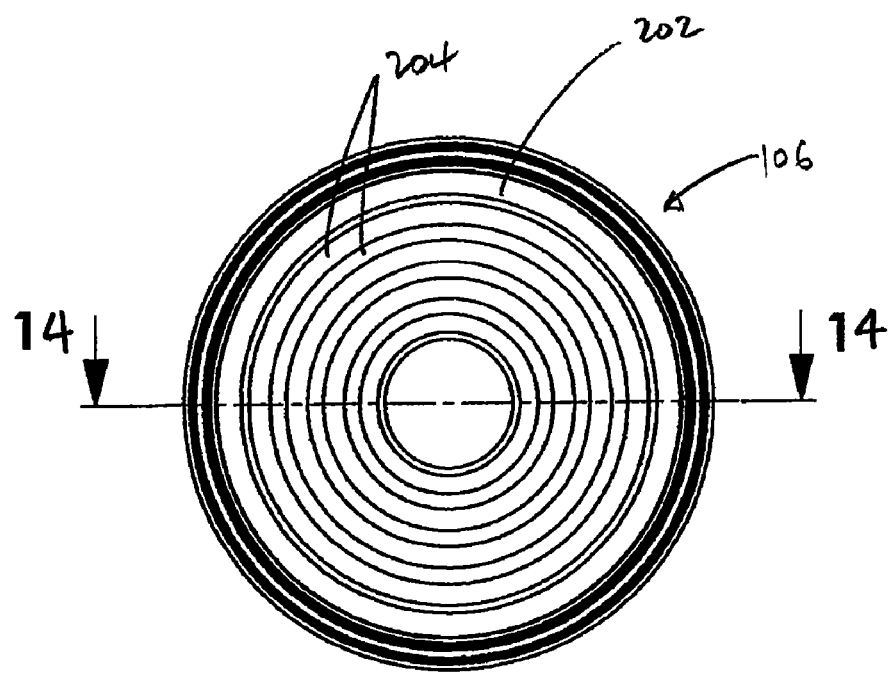
FIG. 15 is a bottom plan view of the container bottom member of FIG. 13.
Figure 14:
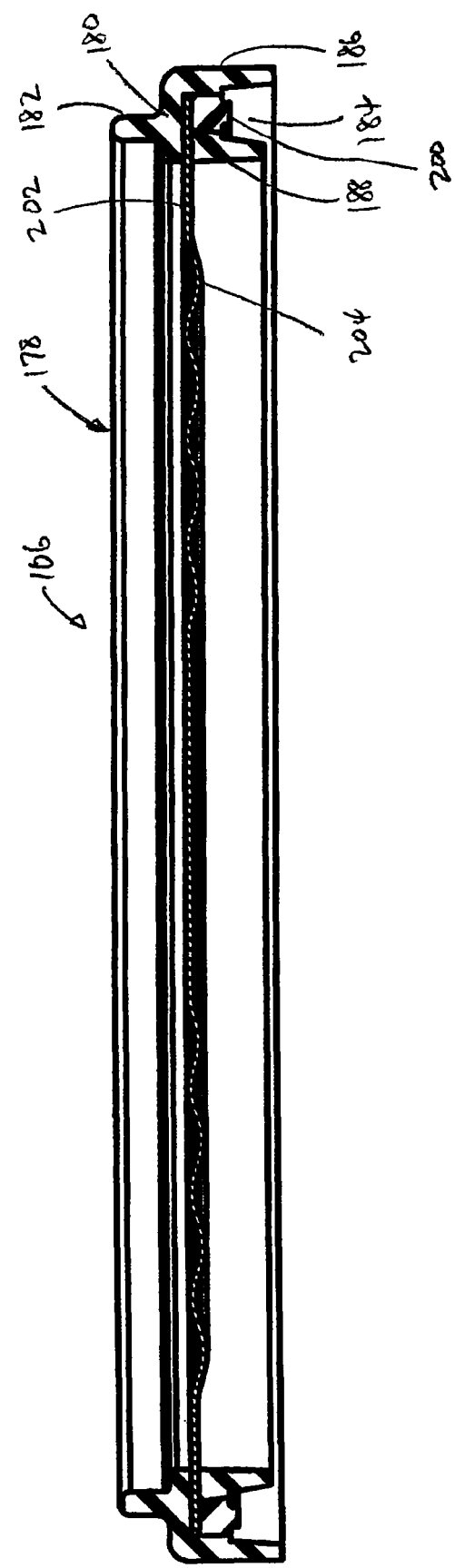
FIG. 14 is a cross sectional view along line 14-14 of FIG. 15.

FIGS. 13-15 illustrate bottom member 106 of container 100, which is generally similar in construction to top member 104. Bottom member 106 includes a frame 178 having a shoulder 180 and an upwardly extending rim 182 (which extends downwardly when bottom member 106 is secured to container 100). Frame 178 further includes a channel 184 defined by shoulder 180 in combination with an outer leg 186 and an inner leg 188. A fusion ring 200 is contained within the upper extent of channel 184.

Bottom member 106 further includes an interior panel 202 located inwardly of frame 178. Panel 202 defines an outer peripheral edge that is surrounded by frame 178. Panel 202 may be formed with undulations 204, which, in combination with the material choice and thickness, are configured to encourage any package deformation caused by an increase or decrease in the internal pressure of the package to occur in panel 202.

Panel 202 is constructed similarly to panel 112, e.g. by die cutting a multi-layered, semi-rigid, high-barrier plastic panel to the desired shape. Bottom member 106 is also constructed similarly to top member 104, by first molding fusion ring 200 in first and second mold sections having a cavity shaped so as to correspond to the final desired shape of fusion ring 200. Fusion ring 200 is constructed similarly to fusion ring 148, including passages, gaps or spaces that establish communication between the inner and outer surfaces of the fusion ring. After fusion ring 200 is formed, the second mold section is removed and lower panel 204 is placed on fusion ring 200 so that the outer edge of lower panel 204 rests on the upper surface of fusion ring 200. A third mold section, in conjunction with the first mold section, fusion ring 200 and panel 202 then forms a cavity for frame 178. Flowable thermoplastic material is then injected into the cavity to form frame 178, and the passages in fusion ring 200 below panel 202 enable the thermoplastic material to flow through fusion ring 200 below lower panel 204, to provide complete molding of the areas of frame 178 located inwardly of fusion ring 200 and below lower panel 204. Bottom member 106 is then released, ejected or otherwise removed from the mold.

Figure 16:
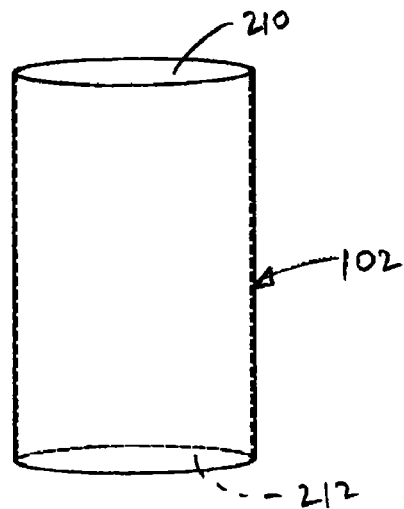
FIG. 16 is an isometric view of a container body, in the form of an extruded tube, for use in making the container of FIG. 1.
Figure 17:
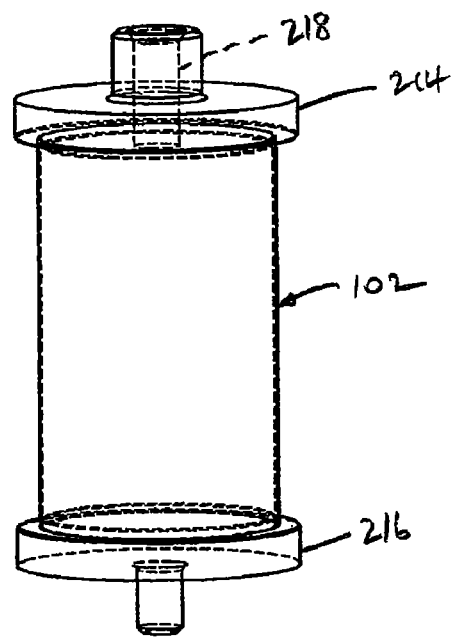
FIG. 17 is an isometric view of the container body of FIG. 16, showing the container body captured between upper and lower seal members for use in forming the container body.
Figure 18:
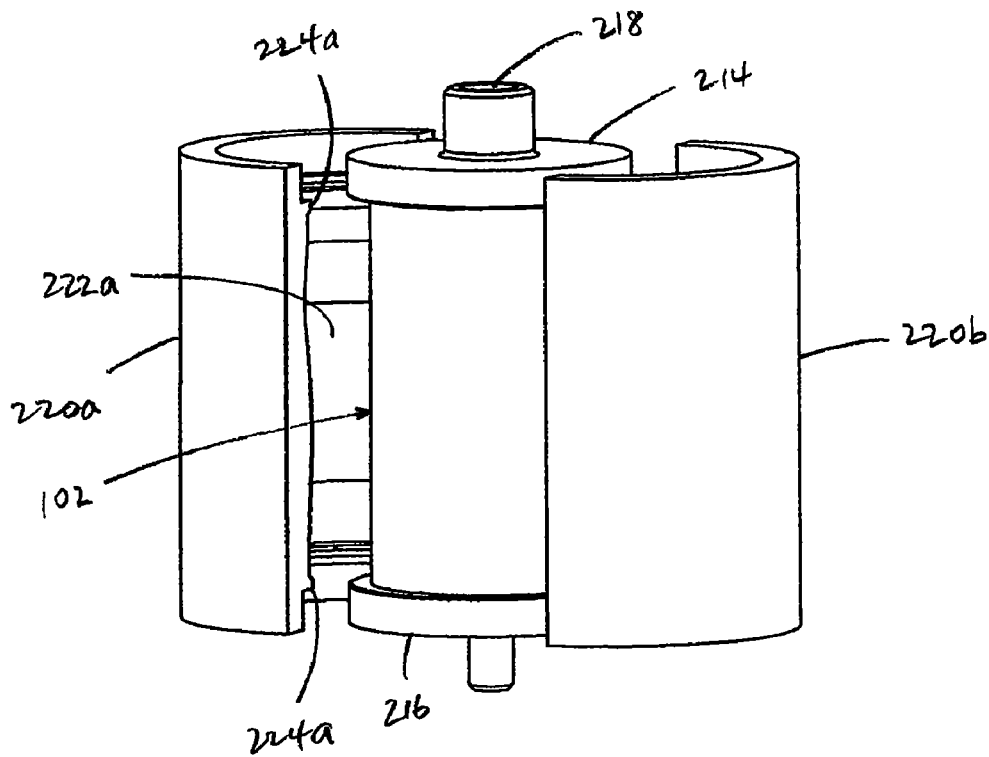
FIG. 18 is an isometric view of the container body of FIG. 16 captured between the upper and lower seal members and positioned between a pair of mold sections for use in forming the container body.

FIG. 16 illustrates container body 102 prior to container body 102 being formed to a contoured shape as shown in FIG. 1. Container body 102 is preferably in the form of an extruded plastic member having a desired length according to the final configuration of container 100. Container body 102 is in the form of a tubular member defining an interior that is accessible through a top opening 210 and a bottom opening 212. Container body 102 may be formed of any satisfactory material, and may be formed of one or more layers, depending upon the requirements of container 100.

FIGS. 17-23 illustrate the manner in which container body 102 is formed to the final desired shape. To form container body 102, an upper holder or seal member 214 is engaged with the upper end of container body 102 so as to overlie and enclose upper opening 210, and a lower holder or seal member 216 is engaged with the lower end of container body 102 so as to overlie and enclose bottom opening 212. One of seal members 214 and 216, such as seal member 214, includes a pressurizing passage 218.

Figure 19:
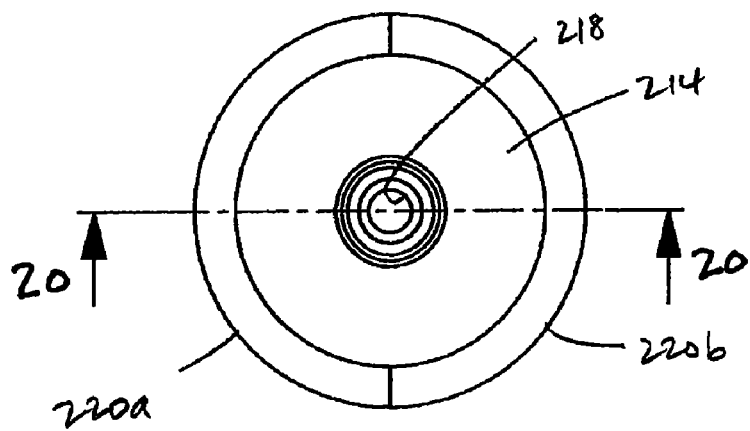
FIG. 19 is a top plan view of the container forming mold sections of FIG. 18 closed upon the seal members and the container body prior to forming the container body.
Figure 20:
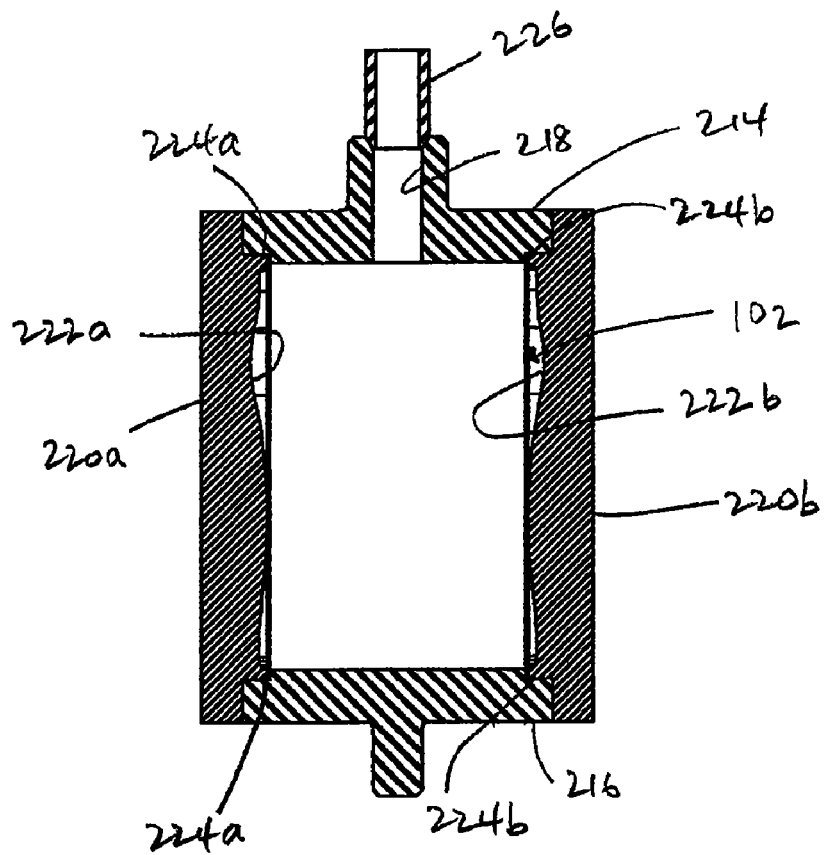
FIG. 20 is a cross sectional view along line 20-20 of FIG. 19.
Figure 21:
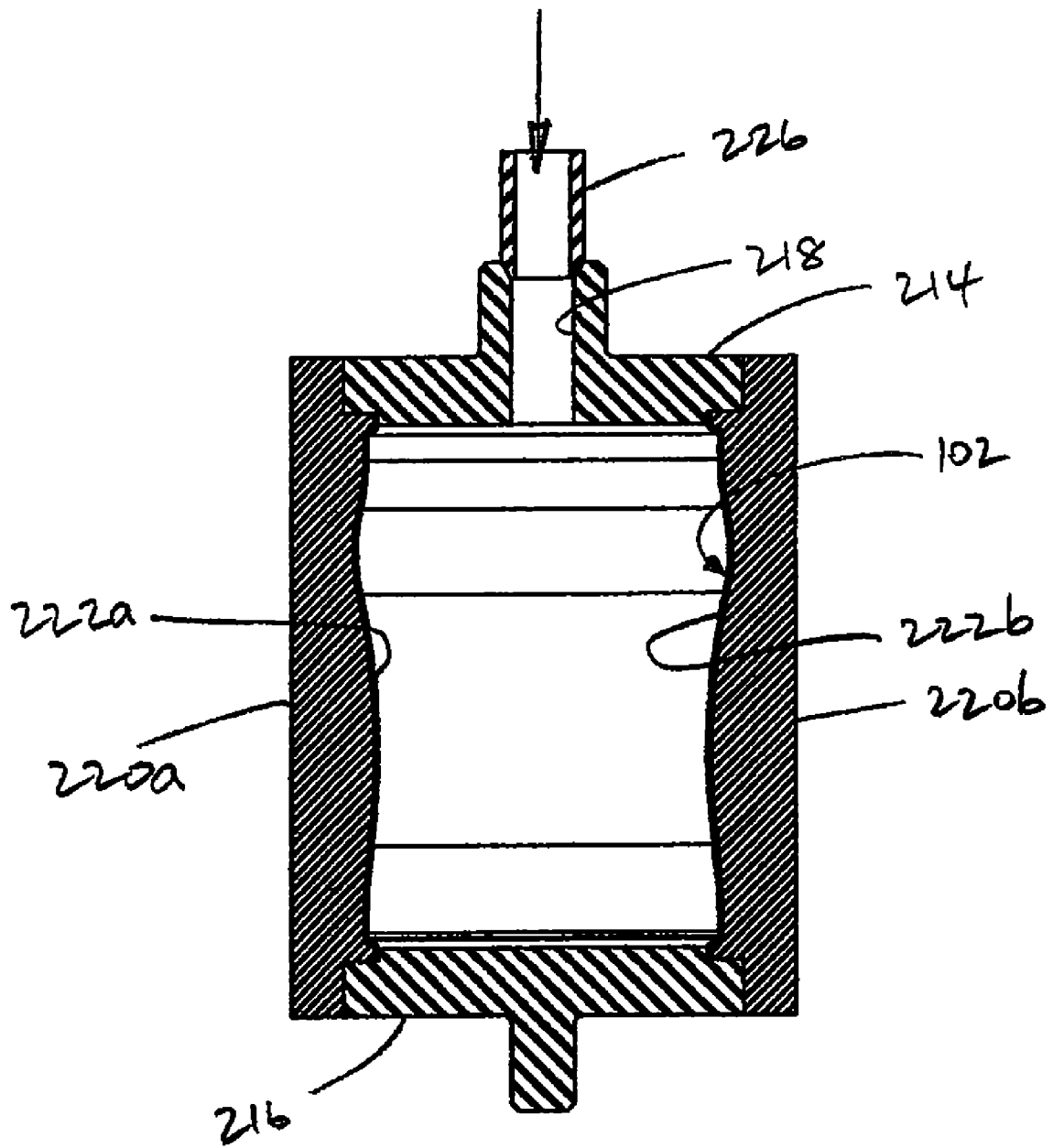
FIG. 21 is a cross sectional view similar to FIG. 20, showing the container body after forming within the mold sections.
Figure 22:
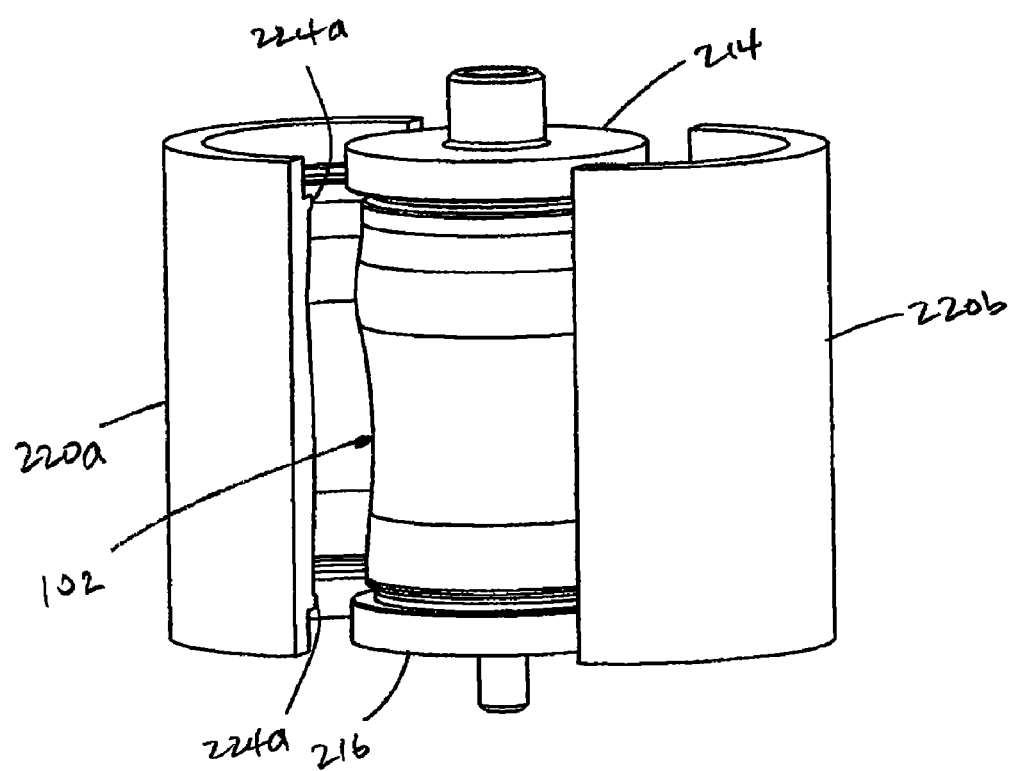
FIG. 22 is an isometric view similar to FIG. 18, showing the container body after forming within the mold sections.

Container body 102 is then converted to a deformable state, such as by exposure to a radiant heat source, to soften the material of container body 102 to a pliable state. The heated container body 102 is then positioned between a pair of mold sections 220a, 220b, which have contoured inner mold surfaces 222a, 222b, respectively, that cooperate to define an internal cavity having a shape that corresponds to the final desired shape of container body 102 when mold sections 220a, 220b are moved together. Mold sections 220a, 220b are then closed onto upper seal member 214, lower seal member 216 and container body 102, as shown in FIGS. 19 and 20. Mold sections 220a, 220b representatively have rims or shoulders 224a, 224b, which are received within recesses defined by seal members 214, 216 and which engage the upper and lower edges of container body 102. With this construction, top and bottom openings 210, 212, respectively, of container body 102 are maintained in the original shape and sealed.

Figure 23:
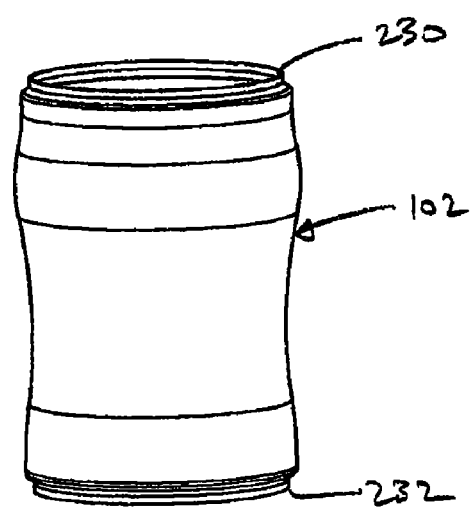
FIG. 23 is an isometric topside view showing the formed container body.

A source of pressurized fluid, such as pressurized gas, is then brought into communication with seal member passage 218, as shown in FIG. 20. Representatively, the source of pressurized gas may be an air blow tube 226. Pressurized air is then applied through blow tube 226 and passage 218 to the interior of container body 102. Such introduction of pressurized air causes the pliable material of the walls of container body 102 to deform outwardly and into contact with the mold surfaces 222a, 222b of mold sections 220a, 220b, respectively, thus forming the desired shape of container body 102. The formed container body 102 is then cooled within the mold sections 220 and/or by air after mold sections 220a, 220b are opened. The cooled and formed container body 102 is then removed from upper and lower seal members 214, 216, respectively, to provide container body 102 having a shape as shown in FIG. 23.

It is understood that the specific shape of container body 102 as shown in the drawings is representative, and that any other shape of container body 102 may be provided as desired.

Alternatively, it is contemplated that the pliable material of the walls of container body 102 may be deformed outwardly into contact with the mold surfaces 222a, 222b of mold sections 220a, 220b, respectively, using a vacuum forming process. In this case, negative air pressure is introduced in the space between the walls of container body 102 and mold surfaces 222a, 222b, such as through vacuum ports formed in mold sections 220a, 220b that open onto mold surfaces 222a, 222b. Such introduction of negative air pressure causes the walls of container body 102 to deform outwardly into contact with mold surfaces 222a, 222b, to form container body 102 to the desired shape. Non-pressurized air is drawn through tube 226 and passage 218 into the interior of container body 102, to add to the volume of air required as the interior volume of container body 102 expands during the vacuum forming operation. The air introduced into the interior of container body 102 may also be pressurized, in order to assist in the vacuum forming of container body 102.

Figure 24:
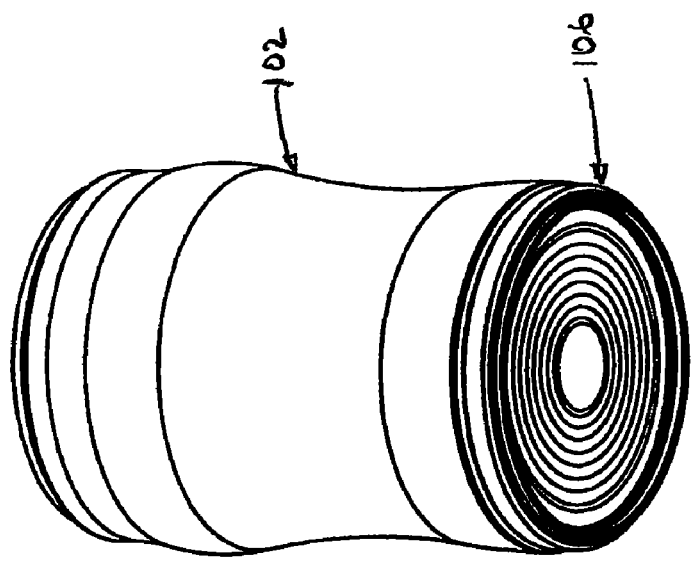
FIG. 24 is an isometric underside view of the container body of FIG. 23 showing a bottom member secured to a bottom edge defined by the container body.

FIG. 24 shows bottom member 106 secured to the lower end of container body 102, in a manner to be explained. FIG. 25 shows both top member 104 and bottom member 106 secured to the upper and lower ends, respectively, of container body 102, to form container 100.

FIG. 27 illustrates the manner in which the upper end of container body 102, shown at 230, is secured to top member 104. Similarly, FIG. 28 shows the manner in which the lower end of container body 102, shown at 232, is engaged with bottom member 106.

In order to produce container 100, bottom member 106 is first secured to lower end 232 of container body 102. To accomplish this, container body lower end 232 is positioned within upwardly facing channel 184 defined by frame 178 of bottom member 106, so that the lower edge of lower end 232 rests on fusion ring 200. Outer leg 186 and inner leg 188 of channel 184 guide lower end 232 into contact with the exposed surface of fusion ring 200. Fusion ring 200 is then exposed to an electromagnetic or radio frequency field while a downward force is applied to container body 102. As disclosed in copending application Serial No. PCT/US/25713 filed Aug. 18, 2003, such exposure of fusion ring 200 to the electromagnetic and/or RF field functions to permanently and hermetically fuse bottom member 106 to lower end 232 of container body 102, due to the heating of fusion ring 200 to a semi-molten state by the non-contact, electromagnetic and/or RF excitement of the metallic and/or carbonaceous fillers contained within fusion ring 200, to embed the lower portion of container body lower end 232 into the semi-molten fusion ring 200. After bottom member 106 is applied and cooled, container body 102 can be filled with product in a manner as is known in the art.

After container body 102 is filled, top member 104 is applied to upper end 230 of container body 102. This is accomplished by first dropping top member 104 onto upper end 230 of container body 102 so that upper end 230 is received within channel 142. Legs 144 and 146 of channel 142 function to guide top member 104 onto upper end 230 of container body 102, until the upper edge of upper end 230 contacts the downwardly facing surface of fusion ring 148. As before, fusion ring 148 is then exposed to an electromagnetic and/or RF field while a downward force is applied to top member 104. Such exposure of fusion ring 148 to the electromagnetic and/or RF field functions to heat fusion ring 148 to a semi-molten state by the non-contact electromagnetic and/or RF excitement of the metallic and/or carbonaceous fillers contained within fusion ring 148, to embed the upper portion of container body upper end 230 into the semi-molten fusion ring 148. Top member 104 is thus permanently and hermetically fused to the top rim of container body 102. After filling and application of top member 104, the contents of container 100 can be accessed by removing seal member 120. In a preferred form, seal member 120 includes a pull tab portion that extends past platform edge 152, which facilitates manual engagement with seal member 120. As noted previously, container 100 can be conveniently reclosed by moving closure member 114 from the open position to the closed position.

Rim 140 of top member frame 110, in combination with channel 142, provide controlled stacking of top members 104, one on top of the other, for improved handling of top members 104 prior to application to the top of container body 102. In addition, rim 182 of bottom member frame 178 is configured to nest with rim 140 of top member frame 110, to provide controlled stacking of containers 100 on top of one another. Shoulder 138 of top member frame 110 provides a seating surface for rim 182 of bottom member frame 178. Further, rims 182 and 140 are configured to control lateral movement between stacked containers.

Inner leg 146 of channel 142 and inner leg 188 of channel 184 are of sufficient length to contain any melted residue from respective fusion rings 148, 200, in order to minimize contact between the product and the electromagnetic or RF responsive polymeric, fusible material of the fusion rings. The outer legs 144, 186 of channels 142, 184, respectively, may be shorter, longer or of equal length relative to the inner legs, depending upon the aesthetic and any additional functional requirements such as to facilitate application to the container body. For example, in the event the outer leg is longer than the inner leg, the top or bottom member can be presented to the container at an angle. As the top or bottom member is lowered, the outer leg catches onto the rim of the moving container, to extract the member from a feeder trough and to guide the member into place on top of the container rim.

Figure 29:
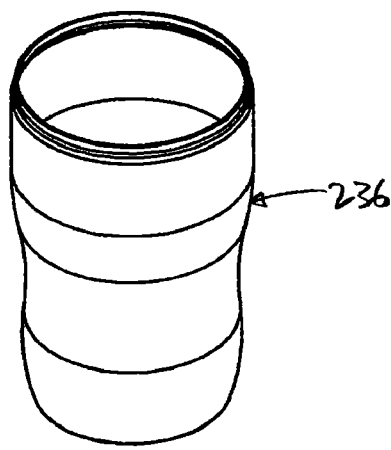
FIG. 29 is an isometric topside view of a blow molded or thermoformed container body for use in forming a container in accordance with the present invention.
Figure 30:
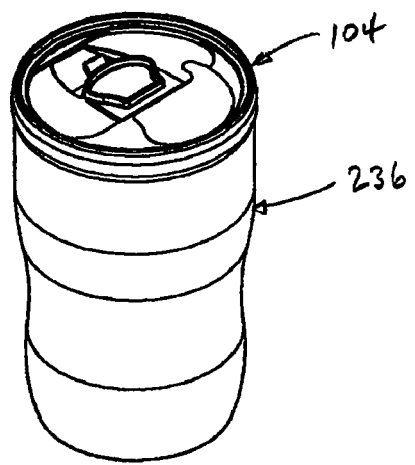
FIG. 30 is an isometric topside view of the container body of FIG. 29 showing the top member of FIGS. 2-9 secured to the upper edge of the container body.
Figure 31:
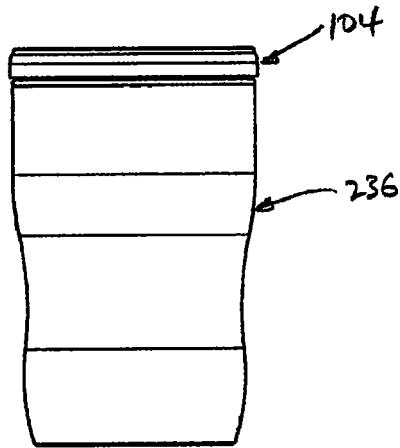
FIG. 31 is front elevation view of the container and top member of FIG. 30.
Figure 32:
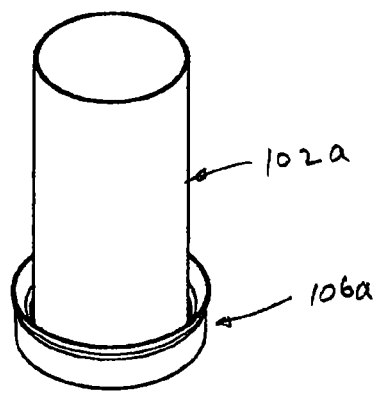
FIG. 32 is an isometric topside view showing an extruded tube container body and a bottom member secured to the bottom edge of the container body.
Figure 34:
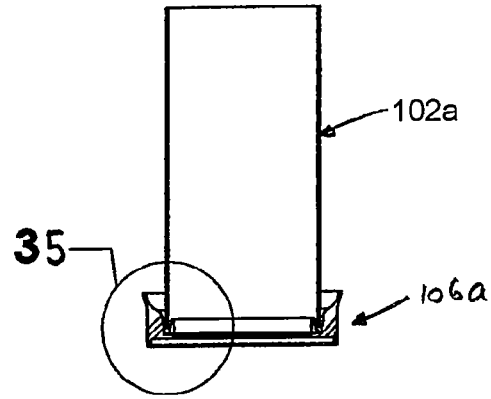
FIG. 34 is a cross sectional view along line 34-34 of FIG. 33.
Figure 33:
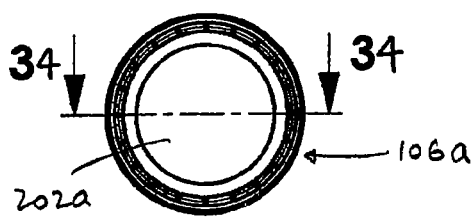
FIG. 33 is a bottom plan view of the bottom member secured to the bottom edge of the container body of FIG. 32.
Figure 35:
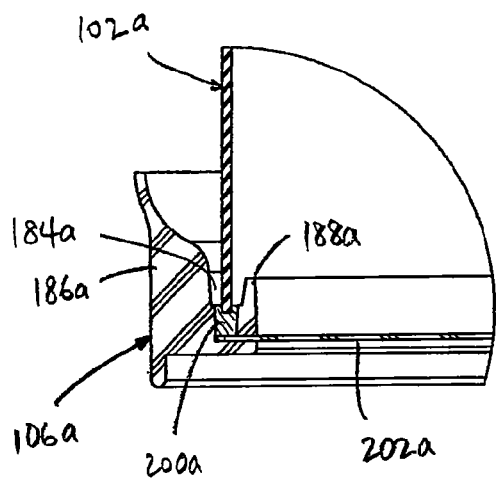
FIG. 35 is an enlarged segmented view within circle 35 of FIG. 34.

FIGS. 29-31 illustrate an alternative container body, shown at 236, which is adapted to be closed using top member 104 in accordance with the present invention. In this embodiment, container body 236 may be blow molded, thermoformed, or formed in any other satisfactory manner, so that container body 236 has an integral bottom wall. With this construction, bottom member 106 is not employed, and the open upper end of container body 236 is closed using top member 104 in the same manner as described above. This construction provides a reclosable top member for a container body of this type.

FIGS. 32-42 illustrate an alternative construction that is contemplated as being within the scope of the present invention, and like characters will be used where possible to facilitate clarity.

In this construction, a bottom member 106a is applied to the lower end of a container body 102a before container body 102a is formed to the final desired shape. In this embodiment, bottom member 106a defines an outer leg 186a of substantially greater height than inner leg 188a. The bottom end of container body 102a is fused to fusion ring 200a as described above.

Figure 36:
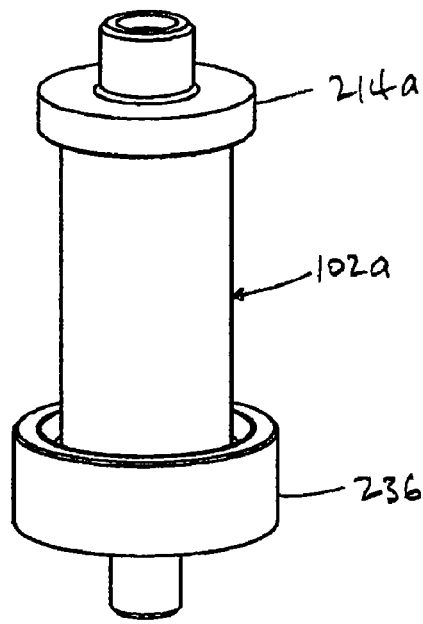
FIG. 36 is an isometric view of the extruded tube container body and bottom member of FIG. 32, captured between a lower holder and an upper seal member for use in forming the container body.
Figure 37:
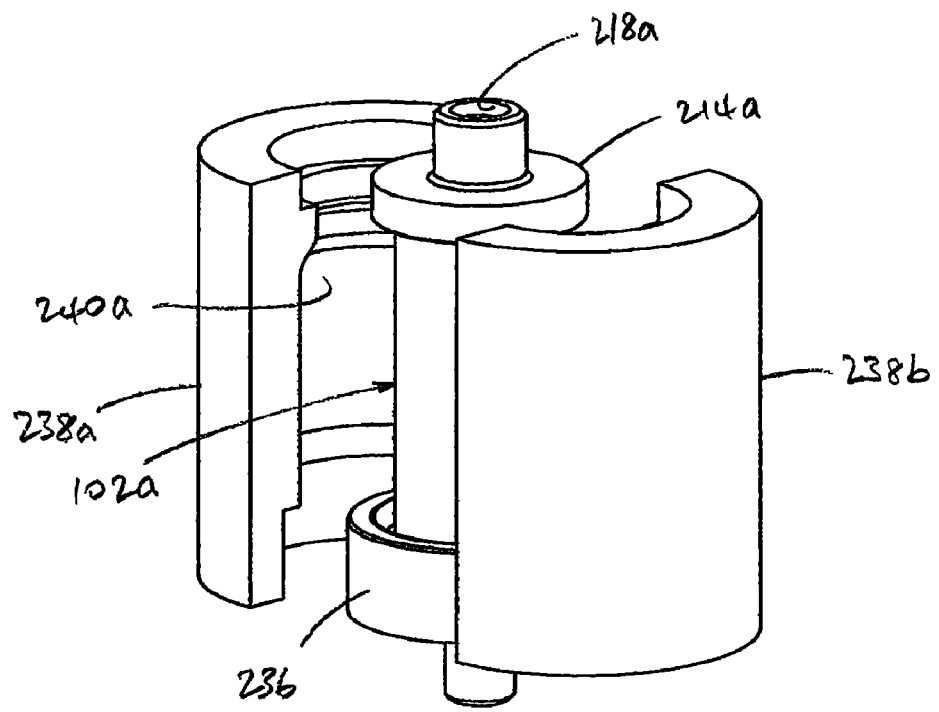
FIG. 37 is an isometric view of the extruded tube container body and bottom member of FIG. 32, captured between the lower holder and the upper seal member and positioned between a pair of mold sections for use in forming the container body.
Figure 38:
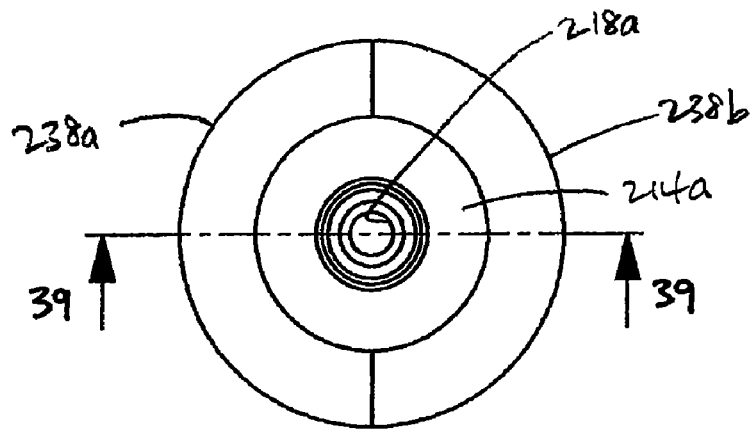
FIG. 38 is a top plan view of the upper seal member of FIGS. 36 and 37 and the container forming mold sections closed upon the container body.
Figure 39:
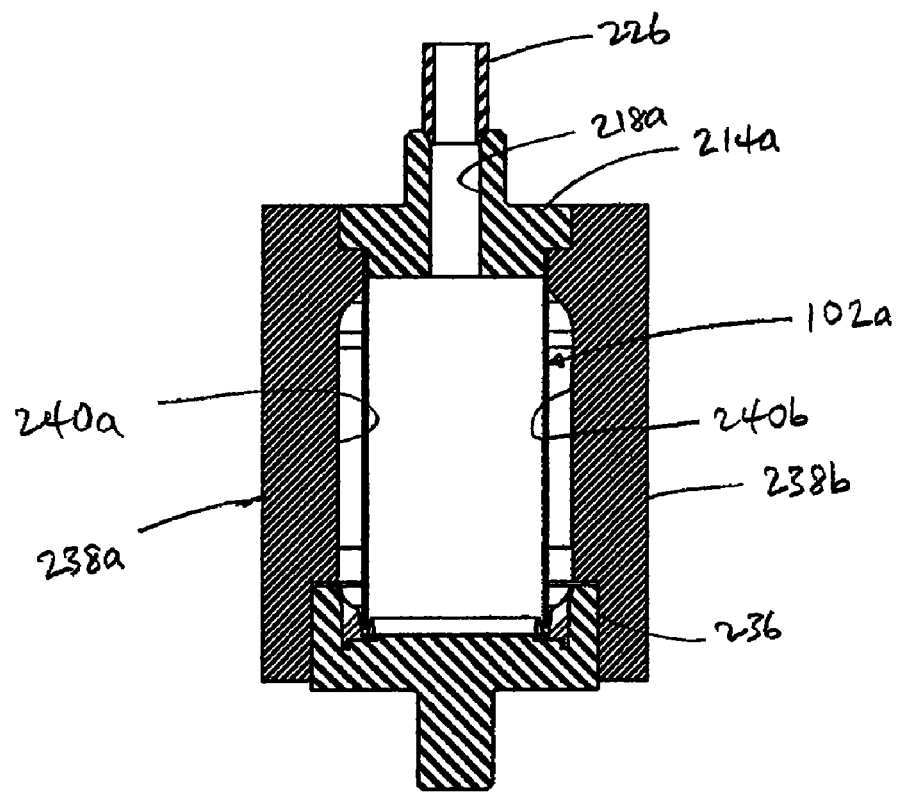
FIG. 39 is a cross sectional view along line 39-39 of FIG. 38, showing the container body prior to forming within the mold sections.
Figure 40:
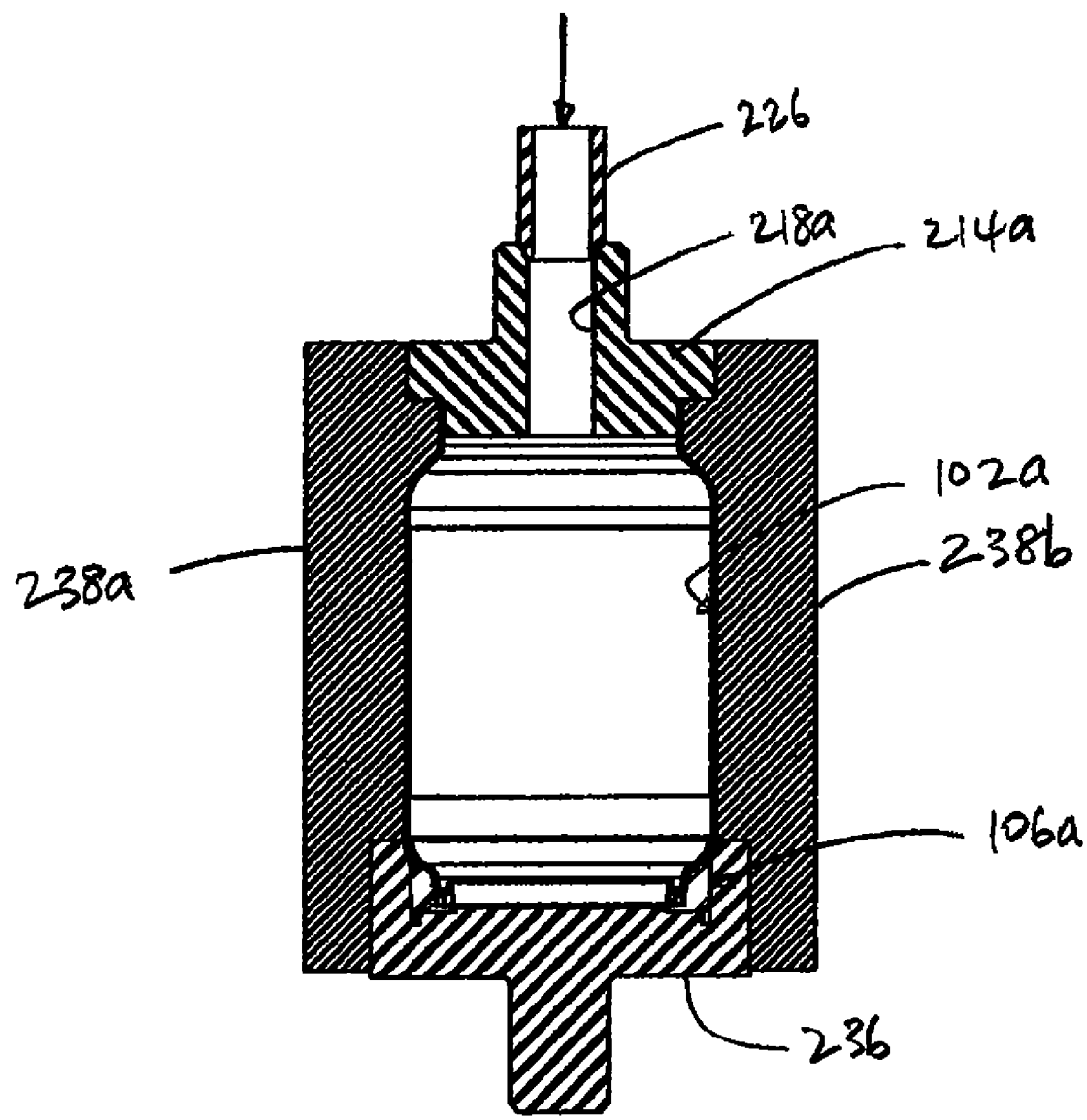
FIG. 40 is a cross sectional view similar to FIG. 39, showing the container body after being formed within the mold sections.
Figure 41:
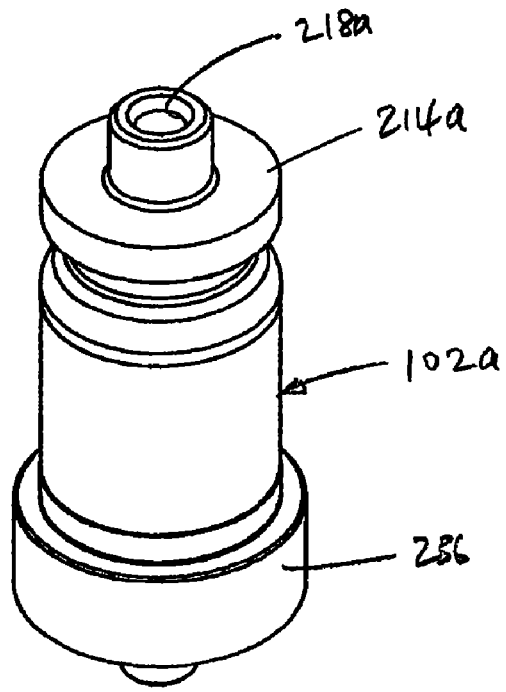
FIG. 41 is an isometric view of the formed container body of FIG. 40 captured between the lower holder and the upper seal member.
Figure 42:
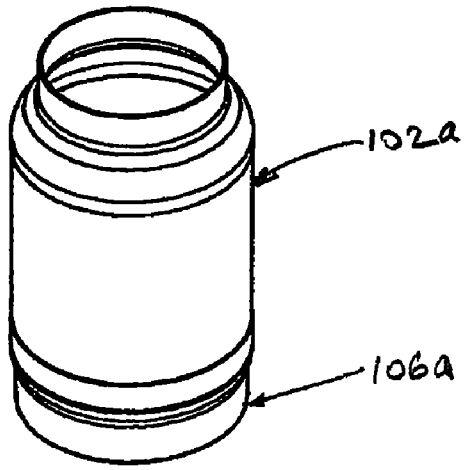
FIG. 42 is an isometric view of the formed container body of FIGS. 40 and 41 after removal from between the mold sections.
Figure 43:
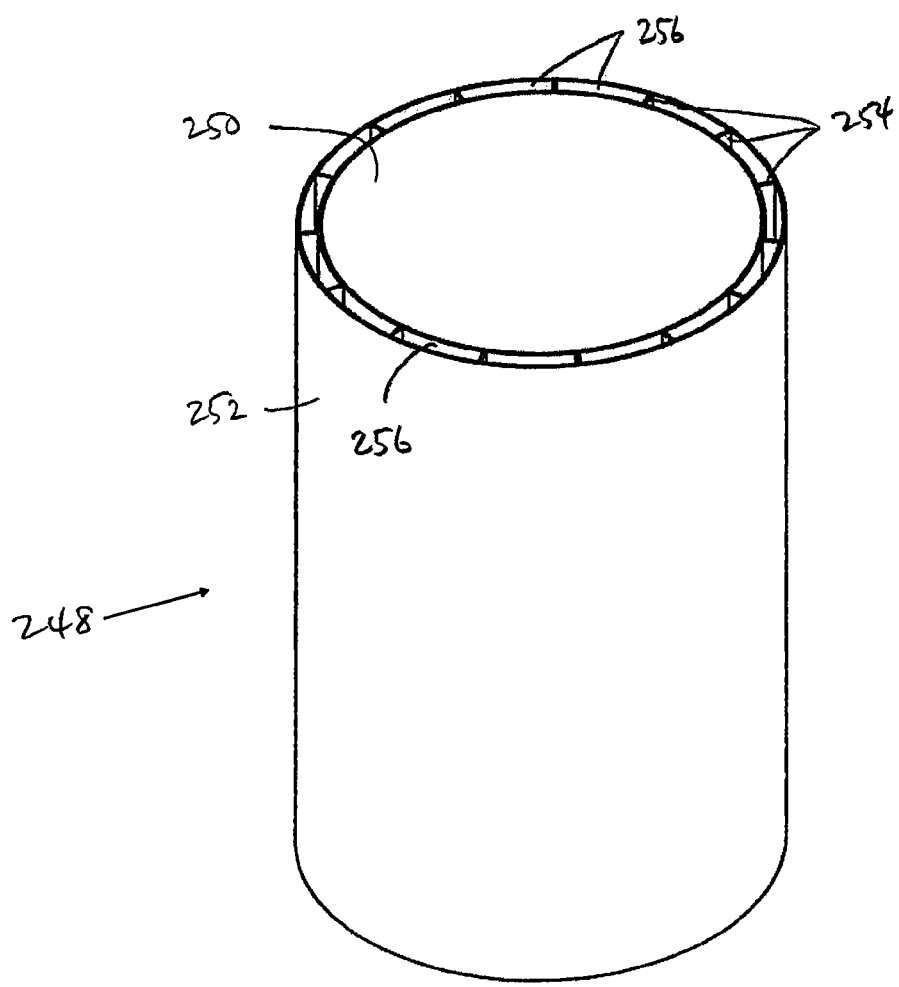
FIG. 43 is an isometric view similar to FIG. 16, illustrating a double wall container body for use in making a container in accordance with the present invention.
Figure 44:
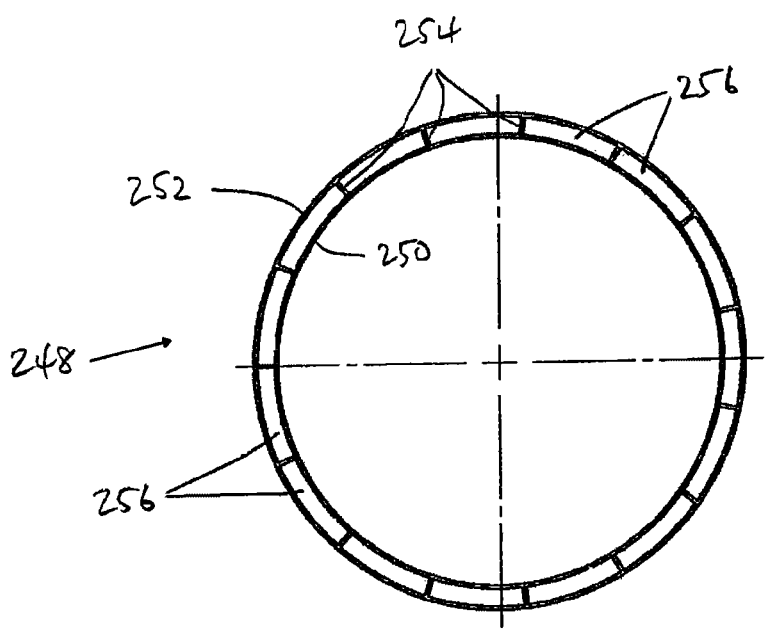
FIG. 44 is a top plan view of the container body of FIG. 43.

After bottom member 106a is applied to the bottom end of container body 102a, upper holder or seal member 214a is engaged with the upper end of container body 102a and bottom member 106a is received within a cavity or recess defined by a lower holder 236, as shown in FIG. 36. Referring to FIG. 37, mold sections 238a, 238b are moved into engagement with upper seal member 214a and lower holder 236. Mold sections 238a, 238b define inner mold surfaces 240a, 240b that cooperate to define a cavity corresponding in shape to the final desired shape of container body 102a. Container body 102a is then heated so that its walls are in a pliable state, and pressurized air is then applied to the interior of container body 102a. The walls of container body 102a are then forced outwardly, as shown in FIG. 40, to conform to the mold surfaces 240a, 240b defined by mold sections 238a, 238b, respectively. In this embodiment, outer leg 186a of channel 184a has a contour that forms a part of the surface against which the walls of container body 102a are forced, so as to partially define the shape of container body 102a. Container body 102a is then cooled, and mold sections 238a, 238b are removed as shown in FIG. 41. Upper seal member 214 and lower holder 236 are then removed, to provide the formed container body 102a and bottom member 106a as shown in FIG. 42. Container body 102a can then be filled with product and a top member applied as before so as to enclose and seal the container body.

FIGS. 43-48 illustrate an alternative container body, shown at 248, which is adapted to be used in forming a container 100 in accordance with the present invention. In this embodiment, container body 248 has a double wall construction, including an inner wall 250 and an outer wall 252. A series of ribs 254 extend between and interconnect inner wall 250 and outer wall 252. Ribs 254 cooperate with inner wall 250 and outer wall 252 to define a series of air chambers 256, which extend throughout the length of container body 248. Representatively, container body 248 may be formed in an extrusion process in which inner wall 250, outer wall 252 and ribs 254 are formed simultaneously, although it is understood that container body 248 may be formed in any other satisfactory process. Either or both of inner wall 250 and outer wall 252 may have a multi-layer construction including a barrier properties layer, if desired. Container body 248 is cut to a desired length after the extrusion process, according to the desired final configuration of the container 100.

Figure 45:
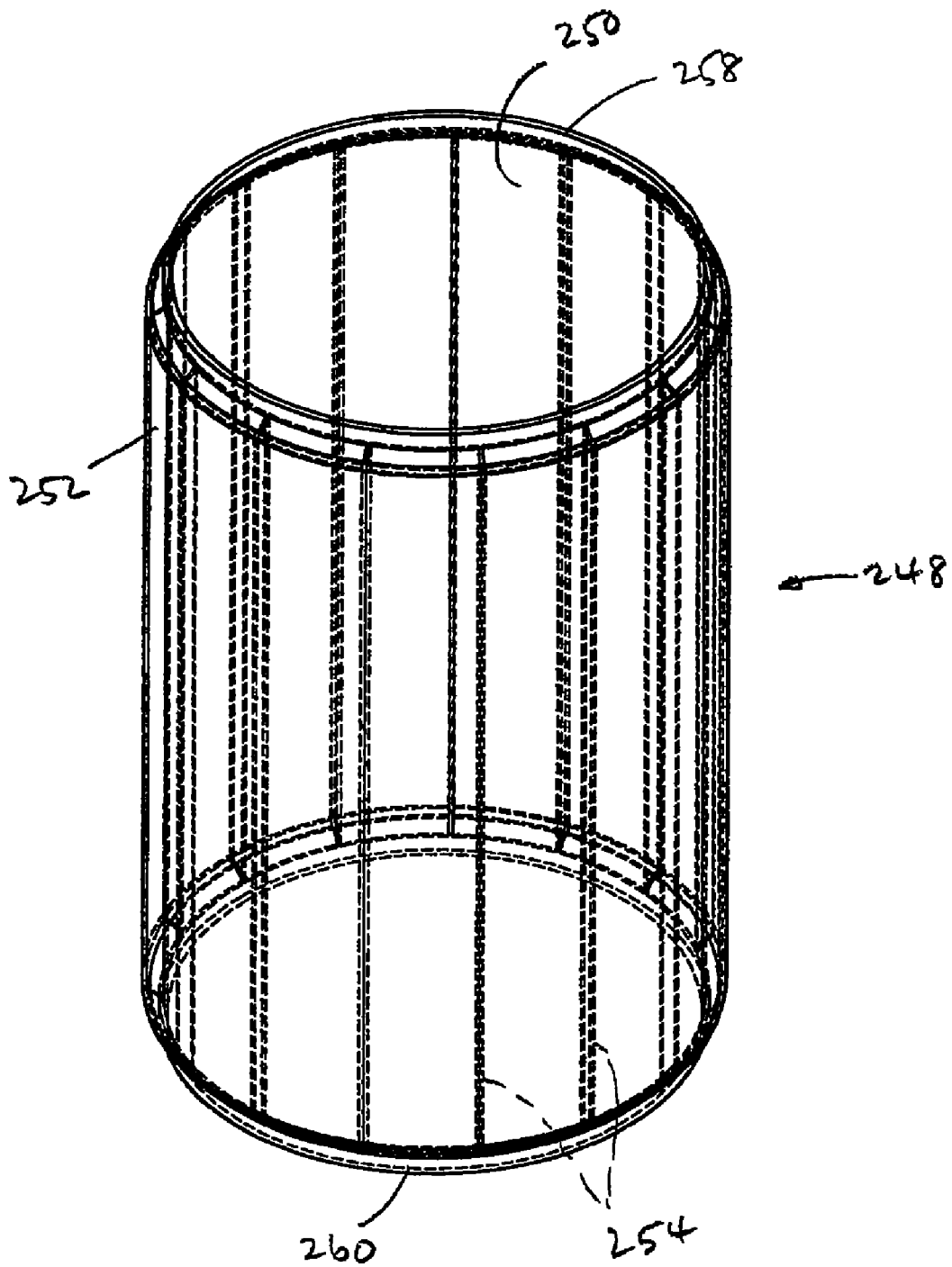
FIG. 45 is an isometric view of the container body of FIG. 43, showing the ends of the container body crimped together in preparation for assembly into the container in accordance with the present invention.
Figure 46:
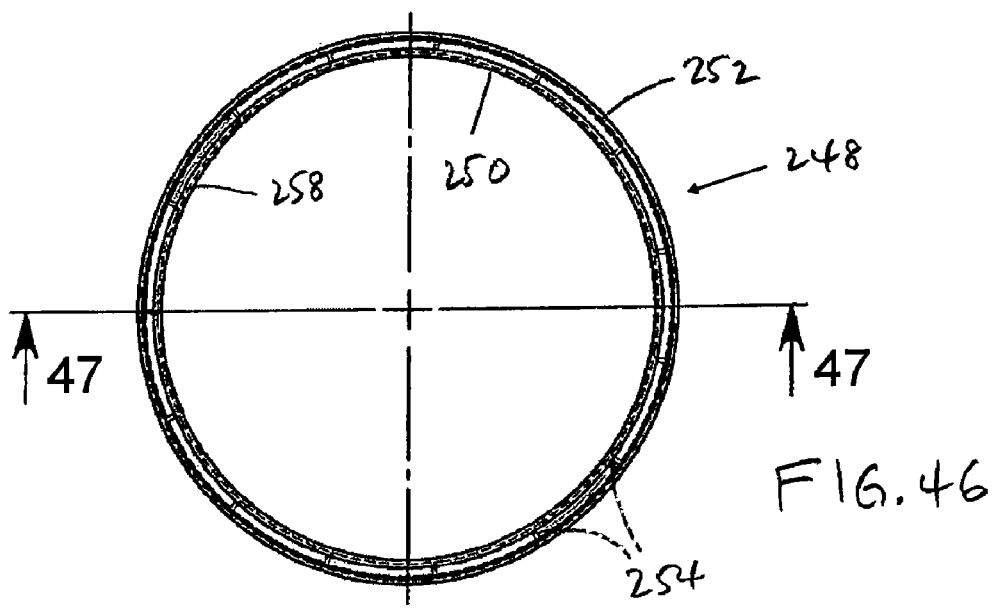
FIG. 46 is a top plan view of the container body of FIG. 45.
Figure 47:
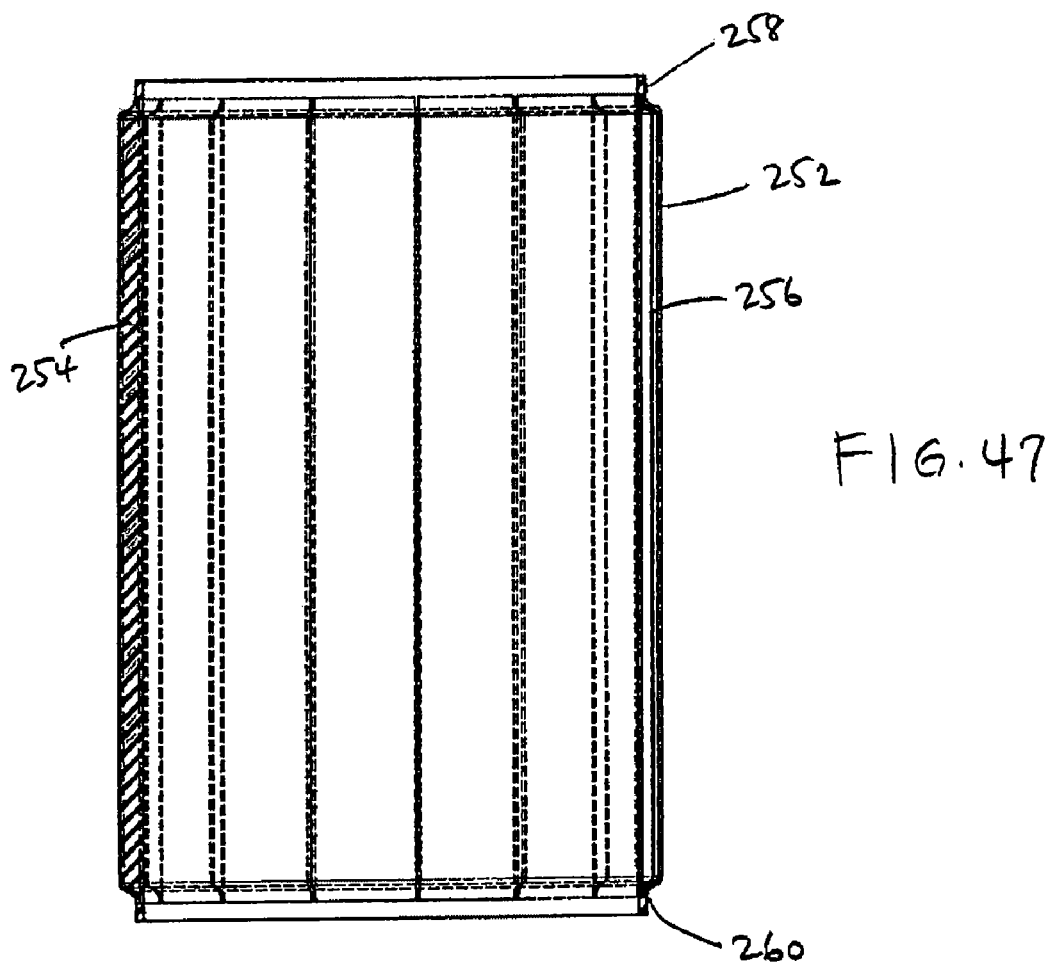
FIG. 47 is a section view taken along line 47-47 or FIG. 46.
Figure 48:
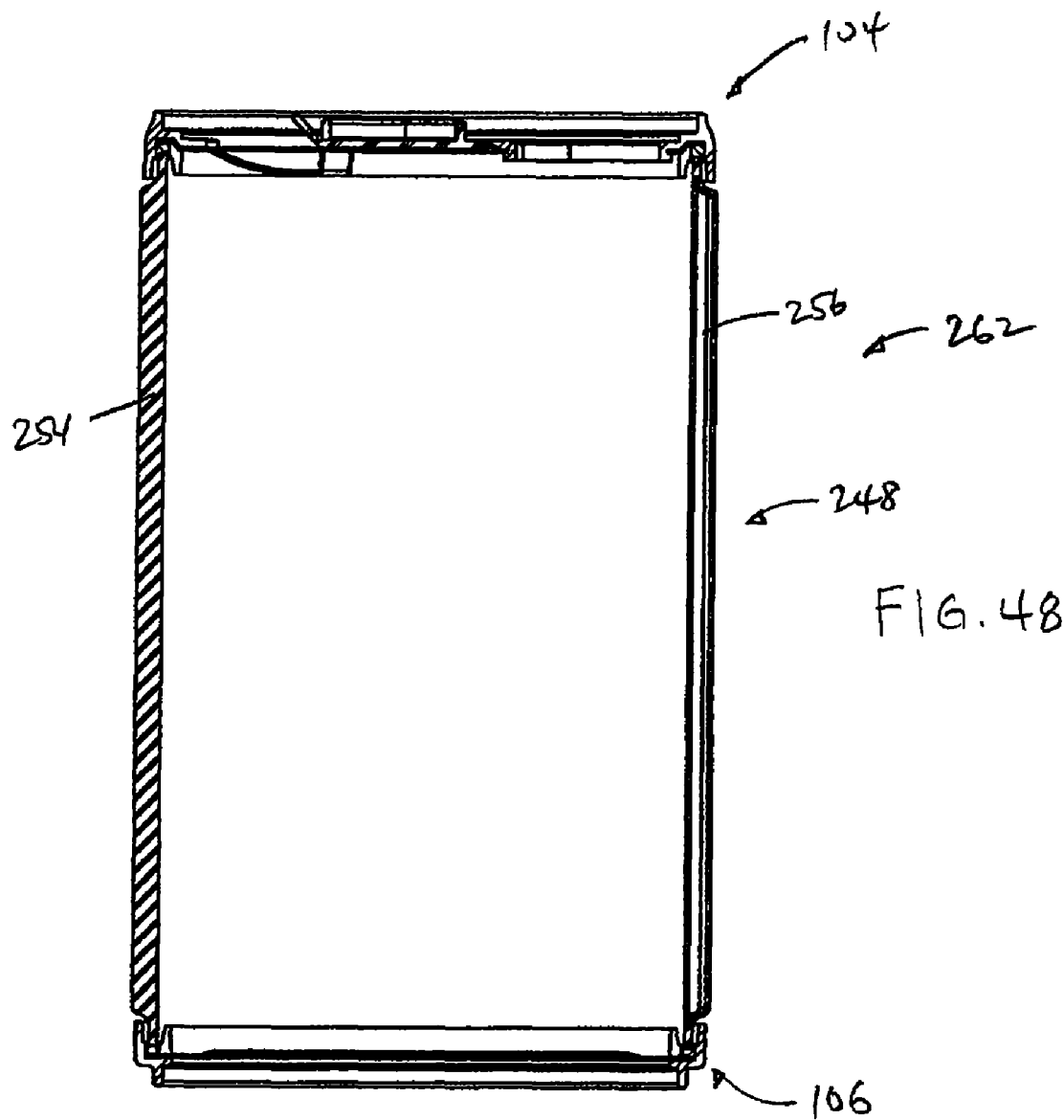
FIG. 48 is a section view similar to FIG. 26, showing the container body of FIGS. 43-47 incorporated into a container in accordance with the present invention.

After being formed as described above, container body 248 is prepared for assembly into container 100 by crimping or otherwise sealing the ends of container body 248 as shown in FIGS. 45-47, to seal air chambers 256. To accomplish this, container body 248 is held between an upper holder and a lower holder, each of which has a plug or other member that fits into the interior of container body 248 at its upper and lower ends, respectively. Each plug conforms to the shape of the interior of container body 248 at its associated end of container body 248. Exterior crimping devices are then engaged with the ends of container body 248, and close upon outer wall 252 to move outer wall 252 toward inner wall 250 at the ends of container body 248. The crimping process also involves heating of the ends of container body 248, so that the material of outer wall 252 and inner wall 250 merges together to form an upper rim 258 and a lower rim 260. The formation of upper rim 258 and lower rim 260 in this manner is such that rims 258, 260 enclose the upper and lower ends, respectively, of air chambers 256. After the ends of container body 248 are crimped together and sealed as described above, container body 248 is utilized in the same manner as container body 102 described above, to produce a container 262 (FIG. 48) that has a similar overall construction to container 100. That is, a lid or top member 104 is applied to upper rim 258 and a bottom cap or member 106 is applied to lower rim 260, in the same manner as described above with respect to the application of top and bottom members 104, 106, respectively, to the upper and lower ends, respectively, of container body 102 With this construction, container 262 has the same advantages over the prior art as described above with respect to container 100, and also includes an insulating feature provided by the presence of sealed air chambers 256 within container body 248.

Figure 49:
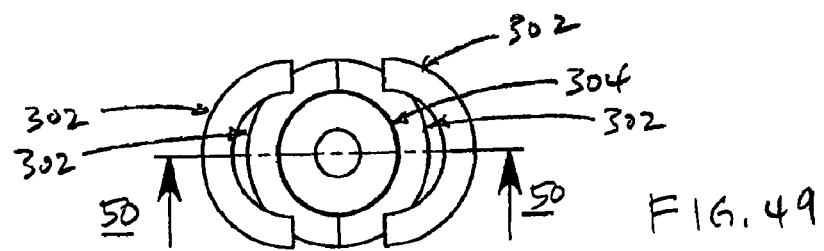
Figure 50:
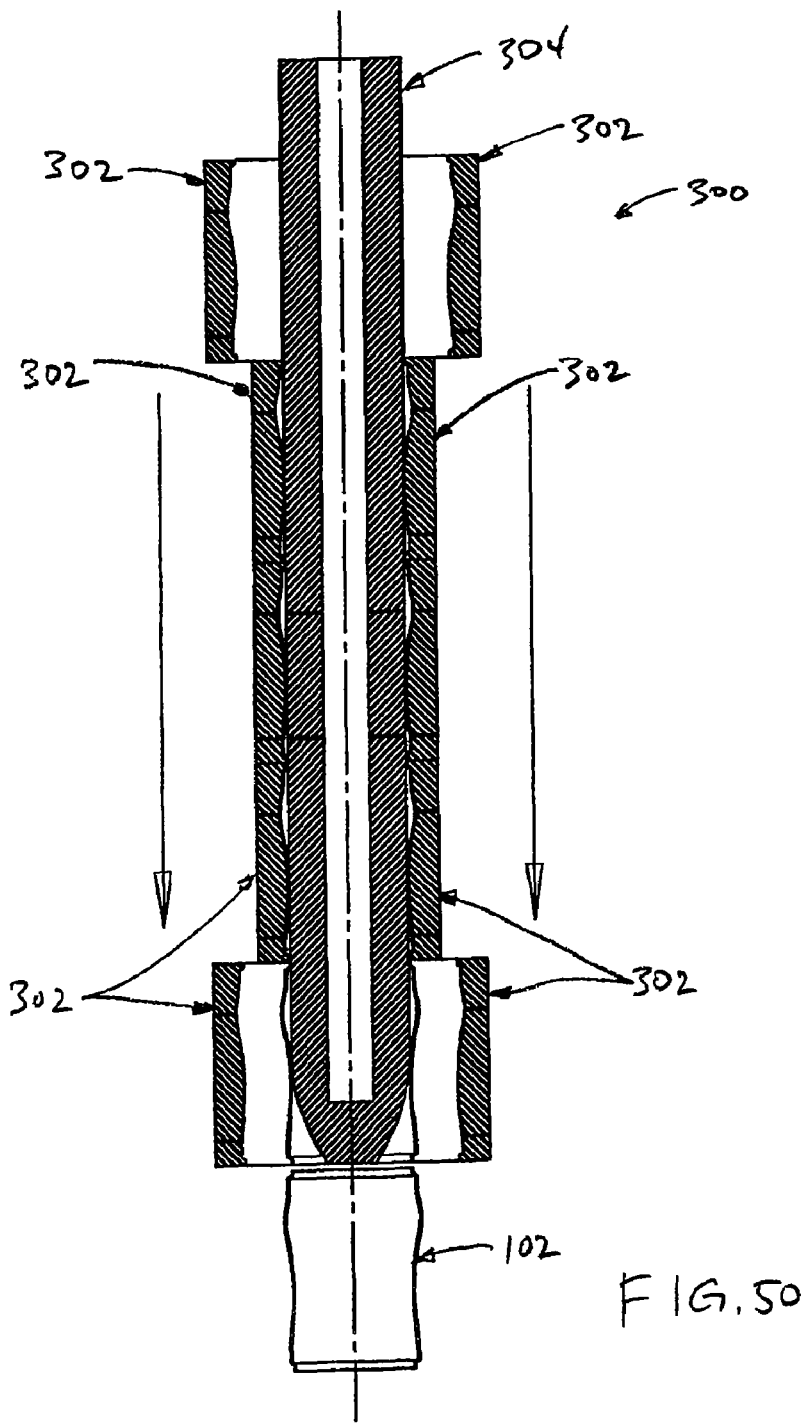
FIG. 50 is a top plan view of tooling for producing formed container bodies, for use in forming a container as shown in FIG. 1, in an alternative molding process known as continuous vacuum forming.

In an alternative forming method, known as continuous vacuum forming, a polymeric tube is continuously extruded and travels between sets of mold halves. A system of this type is schematically illustrated at 300 in FIGS. 49 and 50. In this forming method, moving tooling in the form of a continuous or sequential series of mold halves 302 are mounted to spaced apart runs of a means of conveyance, such as continuous belts trained about pulleys or sprockets, in a manner as is known. An extruded tube is positioned and advanced between the mold halves 302, which are moved together onto the pliable polymeric material of the extruded tube. An internal sizing mandrel or sleeve 304 is carried within the interior of the continuously extruded polymeric tube. The sizing mandrel or sleeve 304 is connected to the end of the die and provides a low pressure seal, to allow the use of internal positive pressure in addition to external negative pressure to facilitate the forming of the container walls. Once the container walls are formed and cooled, the containers 102 are separated (cut) from each other. A system such as this is shown and described in Held, Jr. U.S. Pat. No. 3,837,517 and in Kemerer et al U.S. Pat. No. 5,167,781, the disclosures of which are hereby incorporated by reference.

Crimping can also be accomplished in the continuous vacuum forming system 300 by having the moving tooling press the pliable polymeric material of the tube against the internal sizing mandrel or sleeve 304 that is carried within the interior of the continuously extruded polymeric tube.

While the invention has been shown and described with respect to specific embodiments, it is understood that various alternatives and modifications are possible and are contemplated as being within the scope of the present invention. For example, and without limitation, the container top member, body and bottom member may be a variety of shapes, including non-circular shapes, in addition to the circular shapes as shown in the drawing figures. Likewise, the top member of the container may have a variety of shapes for the platform opening and the rim of the closure member, in addition to the specific shape as shown and described. Further, while mating rims have been shown for providing a container stacking feature, it is contemplated that any other satisfactory mating stacking feature could be designed into the container bottom member which would eliminate the need for the rim feature on the container top member, in which the case the frame of the top member can be flat. Likewise, appropriate stacking features can be designed into the container top member, which can therefore eliminate the need for the rim feature on the container bottom member, so as to enable the bottom of the frame to be flat. While the fusion ring has been shown as being formed either in segments or with channels, it is contemplated that any other satisfactory conduit-type arrangement may be incorporated into the fusion ring so as to allow for the flow through of thermoplastic material during injection molding of the frame about the fusion ring. In addition, the top member can be applied to a container formed by a method other than the container body and bottom cap type as described. Other container types can also be thermoformed or blow molded with a continuous bottom and a flangeless rim at the top. Further, the container body may be simply the extruded tubular member, without being deformed to the shape as shown and described.

While the invention has been shown and described primarily in connection with the use of electromagnetic or RF energy to heat the fusion member to bond the top and/or bottom member to the container body, it is also contemplated that any other type of energy may be employed in order to excite an internal fusion member in a non-contact manner to bond the top and/or bottom member to the container body.

It is also contemplated that the container may be constructed so as to eliminate the reclosable feature provided by closure member 114. In this construction, top member 104 is formed with platform 116 so as to overlie a portion of panel 112 and to enclose the edge of panel opening 122, and closure member 114 is eliminated.

In addition, the container may be filled through the platform opening after the container lid is secured to the container. In this case, the high barrier peel-away seal member is applied after filling. Further, it is also contemplated that the container top member can be secured to the body first, with the container then being filled with product and the bottom cap applied thereafter, in a reverse series of steps to those shown and described in FIGS. 33-42.

It is also contemplated that the container may be fitted with an optional, removable snap-on overcap to serve a variety of purposes. The outer wall of the overcap is designed to fit over the outside leg of the container lid. A bead on the inside surface of the outer wall of the overcap locates below the outside edge of the outer leg of the container lid. The overcap also includes a rim to act in the same manner as the rim of the frame. In a case such as this, an overcap with a rim may be used to eliminate the need for a rim on the frame of the container top member. The overcap acts as a protective cover for the package or for the remaining contents of the package after the package has been opened and the tear-away seal member has been removed and discarded. Optional openings in the overcap may serve as a means for venting heat and steam from the package during microwaving or cooking of the contents of the package.

Various alternatives and embodiments are contemplated as being within the scope of the following claims particularly pointing out and distinctly claiming the subject matter regarded as the invention.

We claim:

1. A method of making a container, comprising the acts of:
   providing a container body having an interior and including at least one edge defining a container opening;
   providing an end member that includes an outer frame portion and a peripheral electromagnetically responsive fusion member embedded within the outer frame portion, wherein the end member is formed in a bi-injection molding process wherein the fusion member is formed in a first injection molding operation and the frame portion is subsequently formed around the fusion member in a second injection molding operation, wherein the fusion member is encapsulated by the frame portion; and
   bonding the end member to the edge of the container body to enclose the opening by subjecting the end member to an electromagnetic field, wherein the fusion member is heated in response to the electromagnetic field to bond the edge of the container body to the material of the frame portion.

2. The method of claim 1, wherein the end member includes a panel having an opening, and wherein the frame portion of the end member includes a peripheral outer area and wherein the panel is located inwardly of the peripheral outer area, and wherein the act of bonding the end member to the edge of the container body to enclose the container opening is carried out by bonding the peripheral outer area of the frame portion to the edge of the container body adjacent the fusion member.

3. The method of claim 2, further comprising the act of providing a movable closure member carried by the end member, wherein the movable closure member is interconnected with the end member so as to provide movement of the closure member between an open position for exposing the panel opening, and a closed position in which the movable closure member overlies and closes the panel opening.

4. The method of claim 1, wherein the fusion member is positioned within a channel defined by the frame portion of the end member such that a surface of the fusion member within the channel is exposed, wherein the channel is configured to receive the edge of the container body to enable the edge of the container body to be positioned against the exposed surface of the fusion member.

5. The method of claim 1, wherein the act of providing the container body is carried out by providing the container body in the form of a tubular member formed of deformable material.

6. The method of claim 1, wherein the first injection molding operation includes forming the fusion member with one or more lateral passages, wherein the second injection molding operation includes injecting moldable material about the fusion member such that the lateral passages of the fusion member enable the material of the frame portion to flow through the fusion member.

7. The method of claim 3, wherein the movable closure member in the open position overlies a portion of the panel, and further comprising the act of placing a release composition between the movable closure member and the panel to prevent adherence of the movable closure member to the panel.

* * * * *

UNITED STATES PATENT AND TRADEMARK OFFICE
CERTIFICATE OF CORRECTION

Page 1 of 1

PATENT NO.           : 8,137,493 B2
APPLICATION NO.      : 12/534531
DATED                : March 20, 2012
INVENTOR(S)          : Richard A. Gross et al.

It is certified that error appears in the above-identified patent and that said Letters Patent is hereby corrected as shown below:

CLAIM 5, column 18, line 52, delete "tubular".

Signed and Sealed this
First Day of May, 2012

David J. Kappos
*Director of the United States Patent and Trademark Office*